(12) United States Patent
Ozasa et al.

(10) Patent No.: US 8,187,514 B2
(45) Date of Patent: *May 29, 2012

(54) BIODEGRADABLE MOLDED ARTICLE

(75) Inventors: Akio Ozasa, Shiga (JP); Akihisa Hashimoto, Shiga (JP); Shinji Tanaka, Shiga (JP)

(73) Assignee: Nissei Company, Ltd., Osaka (JP)

( * ) Notice: Subject to any disclaimer, the term of this patent is extended or adjusted under 35 U.S.C. 154(b) by 662 days.

This patent is subject to a terminal disclaimer.

(21) Appl. No.: 12/230,691

(22) Filed: Sep. 3, 2008

(65) Prior Publication Data

US 2009/0008819 A1    Jan. 8, 2009

Related U.S. Application Data

(62) Division of application No. 10/505,157, filed as application No. PCT/JP03/01858 on Feb. 20, 2003, now abandoned.

(30) Foreign Application Priority Data

Feb. 21, 2002    (JP) .................................. 2002-045059

(51) Int. Cl.
| | | |
|---|---|---|
| B29C 67/00 | (2006.01) | |
| B29C 45/14 | (2006.01) | |
| B32B 5/20 | (2006.01) | |

(52) U.S. Cl. ........ 264/266; 264/41; 264/45.1; 264/46.4; 264/239; 264/241; 264/257; 264/259; 264/260; 264/271.1; 264/279; 428/304.4; 428/318.4; 428/318.8

(58) Field of Classification Search .................... 264/41, 264/45.1, 46.4, 239, 241, 257, 259, 260, 264/266, 271.1, 279; 428/304.4, 318.4, 318.8
See application file for complete search history.

(56) References Cited

U.S. PATENT DOCUMENTS

| 4,863,655 | A |   | 9/1989  | Lacourse et al. |
| 5,153,037 | A | * | 10/1992 | Altieri ......................... 428/35.6 |
| 5,639,518 | A | * | 6/1997  | Ando et al. ................... 427/544 |

(Continued)

FOREIGN PATENT DOCUMENTS

CA    2 143 432    11/2000

(Continued)

OTHER PUBLICATIONS

Derwent Abstract of JP 05-320401, "Biodegradable Molded Foam and Production Thereof", Dec. 3, 1999.

(Continued)

*Primary Examiner* — Christina Johnson
*Assistant Examiner* — Atul P Khare
(74) *Attorney, Agent, or Firm* — Harness, Dickey & Pierce, P.L.C.

(57) ABSTRACT

A bowl-shaped container (10a) which is as a biodegradable molded article adheres a coating film (12) mainly made of biodegradable plastic and having at least hydrophobicity to the surface of the main body (11a) of the container mainly made of starch. The main body (11a) is molded through steam expansion of a slurry or dough molding material containing high-amylose starch and water, or a slurry or dough molding material containing starch, polyvinyl alcohol and water. For these reasons, it is possible to accomplish sufficient strength and at least sufficient water resistance, to exert a very excellent biodegradability and further to provide a biodegradable molded article having excellent moisture absorption strength mainly made of starch even if the biodegradable molded article has a complicated shape.

22 Claims, 23 Drawing Sheets

U.S. PATENT DOCUMENTS

| | | | |
|---|---|---|---|
| 5,861,216 A * | 1/1999 | Doane et al. | 428/532 |
| 5,888,599 A * | 3/1999 | Bradt | 428/35.7 |
| 6,025,417 A | 2/2000 | Willett et al. | |
| 6,040,063 A | 3/2000 | Doane et al. | |
| 6,106,753 A | 8/2000 | Redd et al. | |
| 6,146,573 A * | 11/2000 | Shogren et al. | 264/241 |
| 6,231,970 B1 | 5/2001 | Andersen et al. | |
| 6,893,527 B1 | 5/2005 | Doane et al. | |
| 2003/0107145 A1 | 6/2003 | Ozasa et al. | |

FOREIGN PATENT DOCUMENTS

| | | |
|---|---|---|
| CA | 2143432 C * | 11/2000 |
| CN | 1198173 A | 11/1998 |
| EP | 120 03 039 | 5/2002 |
| JP | 05-278738 A | 10/1993 |
| JP | 05-294332 A | 11/1993 |
| JP | 05-320401 A | 12/1993 |
| JP | 07-010148 A | 1/1995 |
| JP | 07-097545 A | 4/1995 |
| JP | 07-224173 A | 8/1995 |
| JP | 8-500547 | 1/1996 |
| JP | 08-143710 | 6/1996 |
| JP | 11-171238 A | 6/1999 |
| JP | 11-512467 | 10/1999 |
| JP | 2000-142783 A | 5/2000 |
| JP | 2000-169611 | 6/2000 |
| JP | 2001-114912 | 4/2001 |
| WO | WO 01-10928 A1 | 2/2001 |
| WO | WO/01/60898 A1 | 8/2001 |

OTHER PUBLICATIONS

European Search Report dated Aug. 19, 2009 in corresponding European Application No. 03705349.3.

Translation of Japanese Office Action mailed Sep. 13, 2011 for Japanese Application No. 2008-297336.

* cited by examiner

BIODEGRADABLE MOLDED ARTICLE

CROSS-REFERENCE TO RELATED APPLICATIONS

This is a divisional of, and claims priority under 35 U.S.C. §120 to, U.S. application Ser. No. 10/505,157, filed Apr. 28, 2005 now abandoned, which is a U.S. National Phase filing of International Application No. PCT/JP03/01858, filed Feb. 20, 2003, the entire contents of each of which are hereby incorporated by reference, which further claims priority to Japanese Application No. 2002-45059, filed Feb. 21, 2002, the entire contents of which are also incorporated by reference.

TECHNICAL FIELD

The present invention relates to a biodegradable expanded molded article mainly derived from starch, and a biodegradable molded article including a coating film bonded on a surface thereof, and particularly to a biodegradable molded article that can suitably be used for disposable expanded molded articles that are disposed after the use as a food container, a molding buffer material, GES, a wrapping tray, etc.

BACKGROUND ART

Conventionally, a plastic molded article and a paper/pulp molded article are the mainstream of a disposable molded article that is disposed after the use. This is because in most cases, raw materials of the disposable molded article should be durable and strong and at the same time readily formable depending on usage of the molded article.

However, the plastic molded article and the paper/pulp molded article both have difficulties to be used as the disposable molded article, as shown below.

First, when incinerated, the plastic molded article damages an incinerator because of the generation of extremely high heat, or additionally produces environmental pollutants such as dioxin. Also, when the plastic molded article is buried for reclamation, it is impossible to bury the molded article where once the same is buried, since plastics are rarely decomposed naturally. Moreover, due to a recent increase of the amount of waste, it has become difficult to secure new dumping sites year after year. Furthermore, continuous environmental pollution for a long period of time could be caused, since the plastic molded article cannot be decomposed easily.

Also, reserves of fossil fuels such as oil, which are raw materials of plastics, are decreasing year after year, so the plastic molded article could become more expensive in the future.

Meanwhile, the paper/pulp molded article is superior to the plastic molded article in that it can easily be disposed of by incineration and can be decomposed naturally. However, trees, of which paper and pulps are made, grow slowly and thus the mass consumption of paper and pulps substantially reduce forest resources. The reduction of forest resources brings about not only heavy destruction of an environment of the area but also a great impairment of an ability of forests to absorb $CO_2$, and a spun for global warming because of the increase of $CO_2$ from a broad perspective.

So, to solve the aforementioned problems, particularly from an environmental perspective, the disposal method of the molded article has recently shifted from dumping to recycling.

However, as for the recycling, for instance, when a food container, one of the main use of the disposable molded articles, is recycled, residues in the container such as remaining foods and seasonings have to be removed. This is required to avoid a contamination of impurities in the material to be recycled.

Usually the removal of the residues is washed in water, so this induces another pollution such as an increase of the amount of polluted water and subsequent water pollution in rivers and the sea. Also, the recycling requires high cost, because the removal of the residues itself lowers the efficiency of recycling as it needs a lot of time and efforts, and the system of recycling has not been really socially established at the moment.

So, what has become a focus of attention is a recently-developed biodegradation disposal method for the molded article by using microbe, as a new disposal method of the molded article being different from the recycling. This disposal method can avoid the problems above, since in this case the molded article is mainly made of various biodegradable plastics or natural high polymers such as starch.

Especially, in the biodegradation disposal method above, a method to utilize the natural high polymers such as starch and protein particularly draws attentions in terms of its practicality. This is because the various biodegradable plastics have a problem that despite having a fine quality almost comparable to conventional plastics (non-degradable or degradable-retardant), practically they cannot be decomposed quickly enough.

For instance, when the thickness of a molded article made of the biodegradable plastic is heavy, it takes a very long time until the molded article is completely decomposed, so practically it is not possible to produce a molded article with enough volume. Also, when the molded article made of the biodegradable plastic is used practically as a disposable food container, composting the molded article together with food residues is the least harmful disposal method for the environment. However, actually it is difficult to compost them together since the biodegradable plastic above is only decomposed much slower than the food residues. Furthermore, it is also difficult to crash the molded article to hasten the decomposition of the biodegradable plastic, because normally the molded article cannot be crushed easily when it has a certain thickness and strength. Thus it is almost impossible to compost the molded article made of the biodegradable plastic.

Whereas starch and protein, etc. are positively evaluated as the materials because of advantages such as:
  with fine biodegradability, decomposition is quite easy even if the volume is large;
  the resource can be acquired easily on account of an availability of a vegetable starch that is mass-produced by agriculture; and
  a molded article with adequate thickness and thermal insulation can be acquired, since the molded article is usually an expanded molded article.

(1) Japanese Laid-Open Patent Application. No. 5-320401/1993 (Tokukaihei 5-320401; published on Dec. 3, 1993, (2) Japanese Laid-Open Patent Application No. 7-224173/1995 (Tokukaihei 7-224173; published on Aug. 22, 1995), (3) Japanese Laid-Open Patent Application No. 7-10148/1995 (Tokukaihei 7-10148; published on Jan. 13, 1995), (4) Japanese Laid-Open Patent Application No. 2000-142783 (Tokukai 2000-142783; published on May 23, 2000), and (5) Japanese Laid-Open Patent Application No. 7-97545/1995 (Tokukaihei 7-97545 published on Apr. 11, 1995) disclose biodegradation disposal technologies using starch, protein, etc.

First, a molded article derived from the technology (1) or (2) have the advantages that it has better decomposability than a molded article mainly made of the biodegradable plastic and also superior to those derived from paper/pulps in its diversity of the molded shape, since natural starch is mainly used as the material. However, at the same time the molded article derived from the technology (1) or (2) has the disadvantages that it can be used only for limited purposes and is required to barrier moisture, due to its poor water and humidity resistance.

Second, a molded article derived from the technology (3) or (4) is mainly made of starch or similar polysaccharide, and to enhance its water resistance, a natural resin (dammer resin, shellac resin, etc.) is painted on the surface of the molded article to form a water-resistant coating.

However, the surface of the molded article (including expanded molded article) mainly made of starch cannot be completely smoothed, and generation of small irregularities cannot be avoided. Thus small pinholes are likely to be formed on the surface corresponding to the irregularities of the water-resistant coating if the resin is simply painted, so it could be possible to render the molded article water repellent but difficult to make the same complete water proof. Particularly, if the molded article is required to be moisture-resistant, moisture is likely to be absorbed from the pinholes on the water-resistant coating, and the molded article becomes apt to be disfigured.

Furthermore, the dammer resin, the shellac resin, etc. must be dissolved in an organic solvent such as alcohol, etc., when applied to the surface. So this introduces problems in terms of a manufacturing facility. For instance, when the organic solvent is removed after the paint, large-scale equipment is required to prevent diffusion of the organic solvent in the air that causes air and environment pollution.

Now, on a surface of a molded article derived from the technology (5) that is made of, as in the cases of the molded articles of the technologies (3) and (4), poorly water-resistant biodegradable material such as starch, a biodegradable coating agent composed of aliphatic polyester being dissolved in halogenated hydrocarbon is painted. In this case, using a dip method (dip coating method) for actual coating of the surface, an adequately water-resistant coating can be formed even on a complicatedly-shaped molded article.

However, in this method, it is required to remove the halogenated hydrocarbon used to dissolve the coating agent, and as in the case of the technologies (3) and (4), problems such as a requirement of equipment to prevent diffusion of halogenated hydrocarbon arise. Many halogenated hydrocarbons are often harmful for a human body and the environment, and moreover the halogenated hydrocarbon that is concretely mentioned in the technology (5) contains CFC so that it should be released to the air as little as possible. On this account, a large-scale hermetic room and a reclaiming device are required as the equipment above.

In addition to the technologies introduced above, there is a technology in which wax or hydrophobic protein, prepared as a solution to be applied, is painted on the surface of the molded article. Generally, speaking, it is difficult to paint a water-resistant coating on the surface of the molded article evenly and entirely, while the coating on a flat molded article such as a flat plate is relatively easy. However, small irregularities are likely to be formed on the surface of the molded article mainly made of starch as described above and obstruct the formation of an uniform film, and furthermore, the molded article or a painting device has to be rotated when the molded article is roughly circular in cross section, for instance formed like a cup or a bowl. Therefore the painting becomes more difficult.

Besides, even if the coating agent can be painted evenly and entirely by using the dip method, the painted agent runs down before it solidifies and becomes the coating, and an unevenness is likely to show up on the coating.

The wax has a problem of poor heat resistance due to its relatively low melting point. In the meantime, although the hydrophobic protein has better heat resistance and does not need the organic solvent, the molded article absorbs water and is softened/disshaped in the painting process owing to a frequent use of aqueous solvents.

So, a technology that has already been proposed is to laminate a water-resistant coating instead of painting thereof. More specifically, such examples include (6) Japanese Laid-Open Patent Application No. 11-171238/1999 (Tokukaihei 11-171238; published on Jun. 29, 1999), (7) Japanese Laid-Open Patent Application No. 5-278738/1993 (Tokukaihei 5-278738; published on Oct. 26, 1993), (8) Japanese Laid-Open Patent Application No. 5-294332/1993 (Tokukaihei 5-294332; published on Nov. 9, 1993).

A container of the technology (6), made by a pulp molding method instead of molding starch, is covered by a water-impermeable or non-absorbing protective coat. This method has the advantage that conventional plastic coating method can be applied almost without any change. However, at the same time the method has problems such as:

the biodegradation of the pulp-molding takes place slowly since it is made of fiber so that the molded article cannot be disposed together with remaining foods, etc.; and only limited types of the molded article can be produced because it is difficult to make the molded article thicker, and also the molded article is not suitable for a deep drawing.

Meanwhile, a thin film made of biodegradable plastic is formed on a surface of a biodegradable container of the technologies (7) or (8) made of either one of natural polysaccharide or protein, or either of the two materials that are chemically modified but still biodegradable.

In this technology, while the biodegradable plastic is provided as the thin water-resistant coating, the container itself is made of natural polysaccharide, protein, etc. with enough thickness. On this account, the container is sufficiently water-resistant as well as biodegradable. Thus it can be said that this technology is particularly promising among the disposal technologies by dint of biodegradation using starch, protein, etc.

However, the technology (7) is an arrangement that the biodegradable plastic thin film simply covers the main body of the biodegradable container, and a concrete arrangement of the biodegradable container is hardly mentioned.

For instance, when the main body of the biodegradable container is mainly made of polysaccharide or protein, the main body's strength should be cared of, but the technology (7) does not mention the strength at all. Also, the technology does not explain how the biodegradable plastic thin film is actually formed, such as by painting, by attaching preformed film, etc., for instance.

Moreover, the technology (7) does not stipulate the coating state of the biodegradable plastic thin film with respect to the main body of the biodegradable container at all. The biodegradable plastic thin film covers the main body of the biodegradable container mainly made of polysaccharide or protein, to improve the main body's water resistance. But the technology (7) does not mention anything except that the main is covered, so there is no statement about how it is covered.

Even if the biodegradable container is made as disposable one, still the container should have a stability and durability as a one-way container. So the biodegradable plastic thin film should not fall off from the main body of the biodegradable container, and thus the state of coating on the main body of the container is an important factor, but no mention with respect to this can be found in (7).

Furthermore, as already described, it is difficult to use biodegradable plastics as a thick molded article due to its slow biodegradation, so the speed of the biodegradation also greatly depends on not only the thickness of the molded article but also a total amount of biodegradable plastics contained in the molded article. In relation to this, the technology (7) only describes that an effectiveness of the biodegradation is improved if the main body of the biodegradable container is expanded, and there are not comments on a relationship between a degree of the expansion and the biodegradation, and a balance between the biodegradation of the biodegradable plastic and that of the main body of the biodegradable container. As a result, it is not possible to manage the biodegradation of the whole container favorably.

In the meantime, the technology (8) can be assumed to correspond to one of the manufacturing technologies of the biodegradable container disclosed by (7). In this technology, a thermoplastic is dissolved in a solvent and painted on the surface of the main body of the biodegradable container. Then after the solvent is dried and volatilized, another coating thin film made of a thermoplastic is laminated and bonded by thermocompression. That is to say, the technology (8) discloses that thermoplastic is used as an adhesive to bond the coating thin film (equivalent to the biodegradable plastic thin film) securely.

Now, as described in relation to technologies (3) to (5), when the thermoplastic dissolved in the solvent is used, problems such as a requirement of equipment to prevent diffusion of the solvent arise. Moreover, an embodiment of (8) uses chloroform as the solvent and this substance should be scattered in the air as little as possible, thus as in the case of (5), a large-scale hermetic room and reclaiming device are required as the equipment above.

Also, the manufacturing technology of (8) acquires the main body of the biodegradable container by press-molding a sheet made of polysaccharide or protein that is formed in advance in a metal mold. Thus it is impossible to mold molded articles such as a container with deep drawing shape like a cup, molded articles having irregular thickness like a food tray with partitions and a wrapping tray, and molded articles having complex shape like cushioning material for wrapping.

Also, in a conventional art relating to a biodegradable container derived from starch, sufficient strength is acquired. However, "strength" generally means strength under a dry condition and normal atmosphere such as "piercing strength". As mentioned below, according to the present inventors, there is no relation between strength under a dry condition and normal atmosphere and strength under moisture absorption (moisture absorption strength). Therefore, even if the biodegradable container derived from starch has sufficient "strength" what is generally called, it does not have sufficient moisture absorption strength and it may soften or disshaped due to moisture absorption during a long-term storage under high humidity due to moisture absorption.

Furthermore, an expanded molded article derived from starch such as (1) and (2) mentioned above, has a porous matrix structure of starch formed through steam expansion which is a starch structure having a very wide surface area thereon. Since an expanded molded article is expanded and foamed by using evaporative expansion of water, a surface of the starch structure has strong hydrophilicity. On this account, the starch structure is an important factor showing excellent biodegradability. At the same time, it absorbs water and moisture very easily.

Even if the water-resistant coating such as (3) and (4) is formed to protect the molded article which easily absorbs water and moisture, it is possible to prevent water in liquid form from penetrating into the starch structure, while it is impossible to block water vapor in gaseous form.

Also, even if an expanded molded article derived from starch is covered with a film or coating made from a biodegradable plastic available at present, it is difficult to block water vapor as the above case unless it is more than hundreds of μm thick.

Therefore, an expanded molded article derived from starch (starch structure) with high moisture resistance is especially desired.

DISCLOSURE OF INVENTION

The inventors of the present invention filed the patent application for a biodegradable molded article including a biodegradable expanded molded article molded into a specified shape, and a coating film attached to a surface of the biodegradable expanded molded article, wherein the coating film is mainly made of a biodegradable plastic and has at least hydrophobicity, said biodegradable expanded molded article being mainly made of starch or a derivative thereof and molded through steam expansion of a slurry or dough molding material prepared by adding water to the starch or the derivative thereof (International application PCT/JP01/07903, application dated Sep. 12, 2001, unpublished as of the priority date of the present invention).

However, a biodegradable expanded molded article of the above prior invention, starch or a derivative thereof absorbs moisture during a long-term storage under high humidity, and the molded article may be softened or disshaped.

The present invention takes the problem above into account, and hence the object is to provide a biodegradable molded article mainly made of starch that has satisfactory strength regardless of a degree of complexity of the shape, and at least satisfactory water resistance, and a very good biodegradation, furthermore excellent moisture absorption strength (moisture resistant strength).

To achieve the purpose above, the biodegradable molded article of the present invention includes a biodegradable expanded molded article molded in a specified shape, and a coating film attached on a surface of the biodegradable expanded molded article, wherein the coating film is mainly made of a biodegradable plastic and has at least hydrophobicity, said biodegradable molded article being characterized in that the biodegradable expanded molded article is mainly made of starch or a derivative thereof and molded through steam expansion of a slurry or dough molding material prepared by adding water to the starch or the derivative thereof, and that the starch or the derivative thereof includes high-amylose starch or a derivative thereof.

According to the arrangement above, producing the slurry or dough molding material mainly made of starch and steam-expanding this material easily allow manufacture of a highly complicatedly shaped molded article, and make the molded article have improved strength compared with conventional molded article made of starch, since the resultant expanded molded article includes a certain amount of water. Furthermore, inasmuch as a biodegradable coating film is attached on the expanded molded article, it becomes possible to apply the coating film to the molded article in correspondence with the shape thereof easily and certainly, by, for instance, thermocompression bonding using a mold identically shaped as a mold used when the expanded molded article is molded, or simultaneously attaching the coating film at the moment of expansion molding.

The coating film is mainly made of a biodegradable plastic having similar quality to common plastics and has at least hydrophobicity. Thus the expanded molded article mainly made of starch can be water resistant simply by attaching the coating film. Moreover, extrinsic functions such as gas impermeability can be added by choosing appropriate types of biodegradable plastics and so on.

Moreover, according to the arrangement above, the starch or the derivative thereof includes high-amylose starch or a derivative thereof, which can prevent a reduction of strength caused by moisture absorption under high humidity and improve physical strength.

In the description of the present invention, "high-amylose starch" means starch containing not less than 50% of amylose.

To solve the problems above, the biodegradable molded article of the present invention is characterized in that the biodegradable molded article includes a biodegradable expanded molded article molded in a specified shape, and a coating film attached on a surface of the biodegradable expanded molded article, wherein the coating film is mainly made of a biodegradable plastic and has at least hydrophobicity, said biodegradable expanded molded article being mainly made of starch or a derivative thereof and molded through steam expansion of a slurry or dough molding material prepared by adding water and polyvinyl alcohol to the starch or the derivative thereof.

According to the arrangement above, producing the slurry or dough molding material mainly made of starch and steam-expanding this material easily allow manufacture of a highly complicatedly shaped molded article, and make the molded article have improved strength compared with a conventional molded article of starch, since the resultant expanded molded article includes a certain amount of water. Furthermore, inasmuch as a biodegradable coating film is attached on the expanded molded article, it becomes possible to apply the coating film to the molded article in correspondence with the shape thereof certainly and easily, by, for instance, thermo-compression bonding using a mold identically shaped as a mold used when the expanded molded article is molded, or simultaneously attaching the coating film at the moment of expansion molding.

The coating film is mainly made of a biodegradable plastic having similar quality to common plastics and has at least hydrophobicity. Thus the expanded molded article mainly made of starch can be water resistant simply by attaching the coating film. Moreover, extrinsic functions such as gas impermeability can be added by choosing appropriate types of biodegradable plastics and so on.

Furthermore, according to the arrangement above, inasmuch as the molding material includes polyvinyl alcohol, it is possible to prevent a reduction of strength caused by moisture absorption of starch under high humidity and to improve physical strength.

Therefore, according to the arrangement above, as described above, it is possible to provide a biodegradable molded article mainly made of starch which is sufficiently strong and at least sufficiently water resistant and has a very good biodegradability and excellent moisture absorption strength regardless of the complicated shape, to exert a very excellent biodegradability, and to provide a biodegradable molded article mainly made of starch having an excellent water absorption strength.

It is preferable that in the biodegradable molded article in each arrangement, the molding material further includes water insoluble fiber.

According to the arrangement above, strength, especially pressure capacity can be further improved, thereby preventing any damage at a fall.

Other and further objects, features and advantages of the present invention will appear more fully from the following description. Also, the merits of the present invention will be apparent from the following description taken in connection with the accompanying drawing.

BEST MODE FOR CARRYING OUT THE INVENTION

An embodiment of the present invention is described below in accordance with attached figures. By the way, the invention is not limited to this embodiment.

A biodegradable molded article in accordance with the present invention includes a biodegradable expanded molded article molded in a specified shape and a coating film attached to the surface thereof, wherein the coating film is mainly made of biodegradable plastic and has at least hydrophobicity. The biodegradable expanded molded article is made of (a) starch or a derivative thereof as the main material including high-amylose starch or a derivative thereof and molded by conducting steam expansion to slurry or dough molding material which is made by adding water to the main material, or is made of (b) starch or a derivative thereof as the main ingredient and molded by conducting steam expansion to slurry or dough molding material which is made by adding water and polyvinyl alcohol.

Also, in the biodegradable molded article above, a preferred arrangement is either:

an amount of biodegradable plastics such as the coating film is stipulated to be steady with respect to the biodegradable expanded molded article; or a ratio of the amount of gas phase included in the biodegradable expanded molded article is stipulated as a certain amount, and moreover, the coating film above preferably coats the surface of the biodegradable expanded molded article in the state that the coating film is substantially adhered to the surface. In this case, an adhesive layer may be inserted between the surface and the coating film, despite it is preferred if the coating film is directly adhered.

By the way, in the description below, the term "the biodegradable expanded molded article" may be shortened as "expanded molded article" without notice. Also, the "slurry" state as above indicates a state that starch has enough fluidness when at least water is added. Thus the starch only needs to be suspended and does not have to be dissolved in water. Meanwhile, the "dough" state as above has lower fluidness compared to the slurry state, and the material is half solidified.

The biodegradable molded article in accordance with the present invention is described. More specifically, if a bowl-shaped container is taken as an example of the biodegradable molded article, as FIG. 1 (a) shows, the bowl-shaped container 10a includes a main body 11a of the container which is the biodegradable expanded molded article and a coating film that is directly adhered substantially fast to the main body 11a to cover the surface thereof. Also, as FIG. 1 (b) shows, the bowl-shaped container 10a may include an adhesive layer 13 inserted between the coating film 12 and the main body 11a, to attach the coating film 12 to the surface of the main body 11a. By the way, as described later, the surface of the main body 11a is not necessarily to be completely covered by the coating film 12, so may be partly covered by the same.

Figure 2:
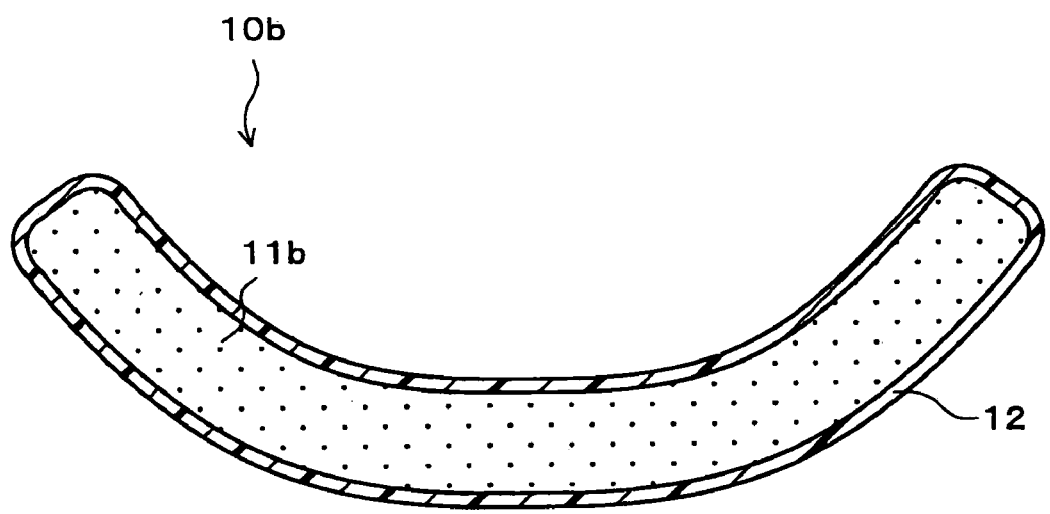
FIG. 2 (a) and FIG. 2 (b) are schematic cross-sectional views showing a shape of a plate-shaped container as another example of a biodegradable molded article of an embodiment in accordance with the present invention.
Figure 2:
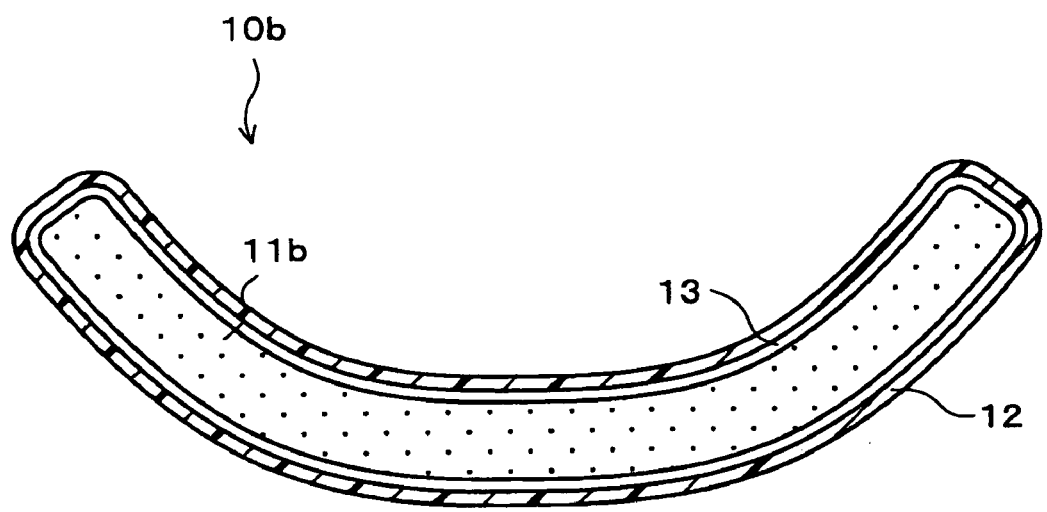

Correspondingly, if a plate-shaped container is taken as another example of the biodegradable molded article in accordance with the present invention, the plate-shaped container 10b is also arranged either to include the main body 11b and the coating film 12 as FIG. 2 (a) shows, or additionally to include the adhesive layer 13 between the main body 11b and the coating film 12 as FIG. 2 (b) shows.

Figure 3:
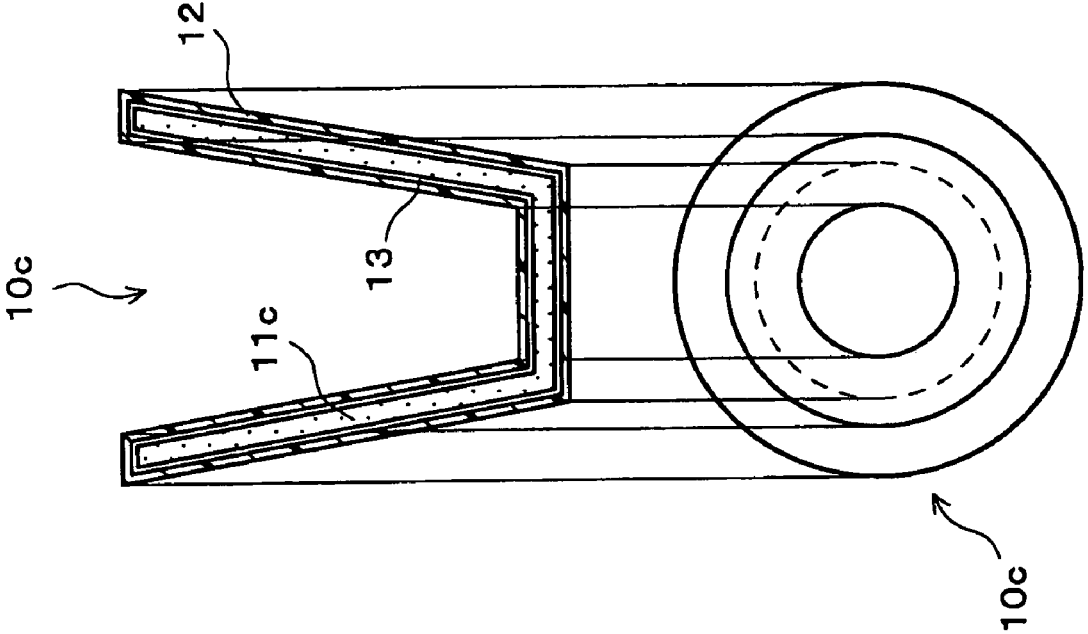
FIG. 3 (a) and FIG. 3 (b) are a schematic cross-sectional view and a schematic plan view showing a shape of a cup-shaped container as still another example of a biodegradable molded article of an embodiment in accordance with the present invention.
Figure 3:
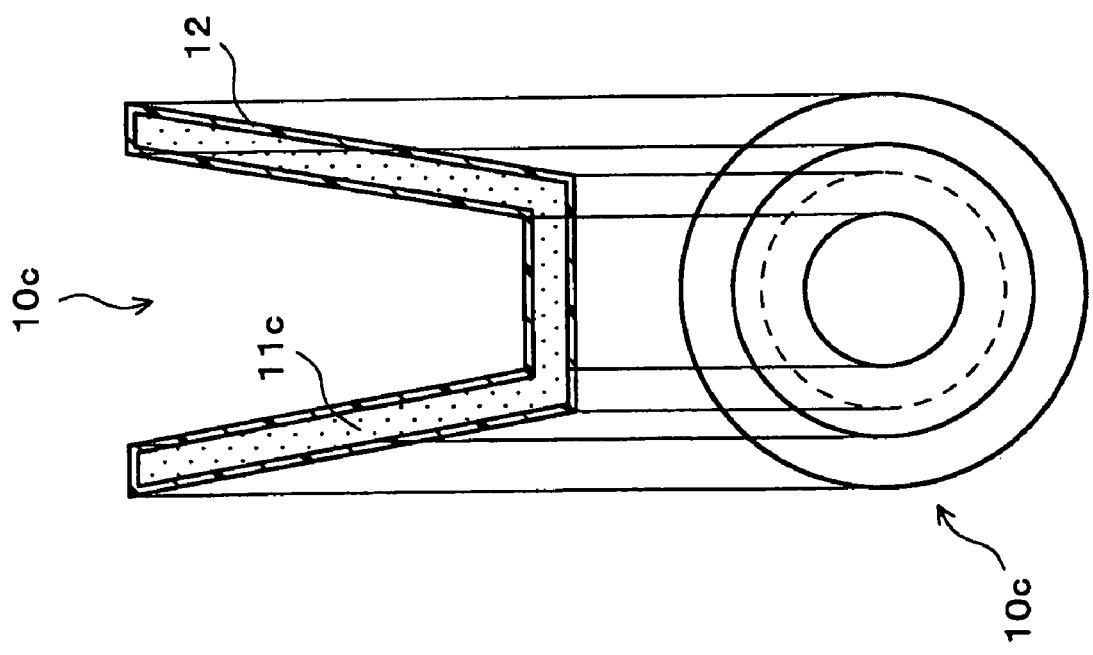

Moreover, if a cup-shaped container is taken as another example of the biodegradable molded article in accordance with the present invention, the cup-shaped container 10c is also arranged either to include the main body 11c and the coating film 12 as FIG. 3 (a) shows, or additionally include the adhesive layer 13 between the main body 11c and the coating film 12 as FIG. 3 (b) shows. By the way, in FIGS. 3 (a) and (b), the upper figure is a vertical cross-sectional view of the cup-shaped container 10c and the lower figure is a plan view (a figure looking down at the cup-shaped container 10c from above) in relation to the upper figure.

The biodegradable expanded molded article, which constitutes the main body (the main bodies 11a, 11b, and 11c) of the biodegradable molded article in accordance with the present invention, is molded from a slurry or dough molding material mainly made from starch or a derivative thereof and prepared by adding water, through steam expansion.

The molding material above is a molding material wherein at least part of starch or a derivative thereof is high-amylose starch (hereinafter referred to as "a first molding material"), or a molding material further containing polyvinyl alcohol (hereinafter referred to as "a second molding material"). It is possible to prevent a reduction of strength caused by moisture absorption of starch under high humidity and to improve physical strength by using the first or second molding material.

High-amylose starch used for the first molding material is not particularly limited, but starch containing not less than 60% of amylose is preferable. It is thus possible to further improve strength when starch absorbs moisture during a long-term storage under high humidity (hereinafter referred to as moisture absorption strength without notice).

Starch and a derivative thereof (including high-amylose starch) used as the main material of the molding material is not limited to any particular type. For instance, starch easily acquired from agricultural products worldwide as major cereals, such as potato, corn, tapioca, rice, wheat, sweet potato, etc. can be preferably used. The starch above may be either produced from a particular agricultural product or a mixture of starch produced from more than one agricultural product.

Also, the derivative of high-amylose starch is a derivative that is chemically modified but still biodegradable, more specifically, such as α-high-amylose starch, cross linked high-amylose starch, and denatured high-amylose starch. Moreover, a mixture of unmodified high-amylose starch and a derivative of high-amylose starch can be used.

The percentage of high-amylose starch or a derivative thereof in starch or a derivative thereof is preferably not less than 50 weight %, more preferably not less than 60 weight %, still more preferably not less than 75 weight %, which can further improve moisture absorption strength.

Figure 4:
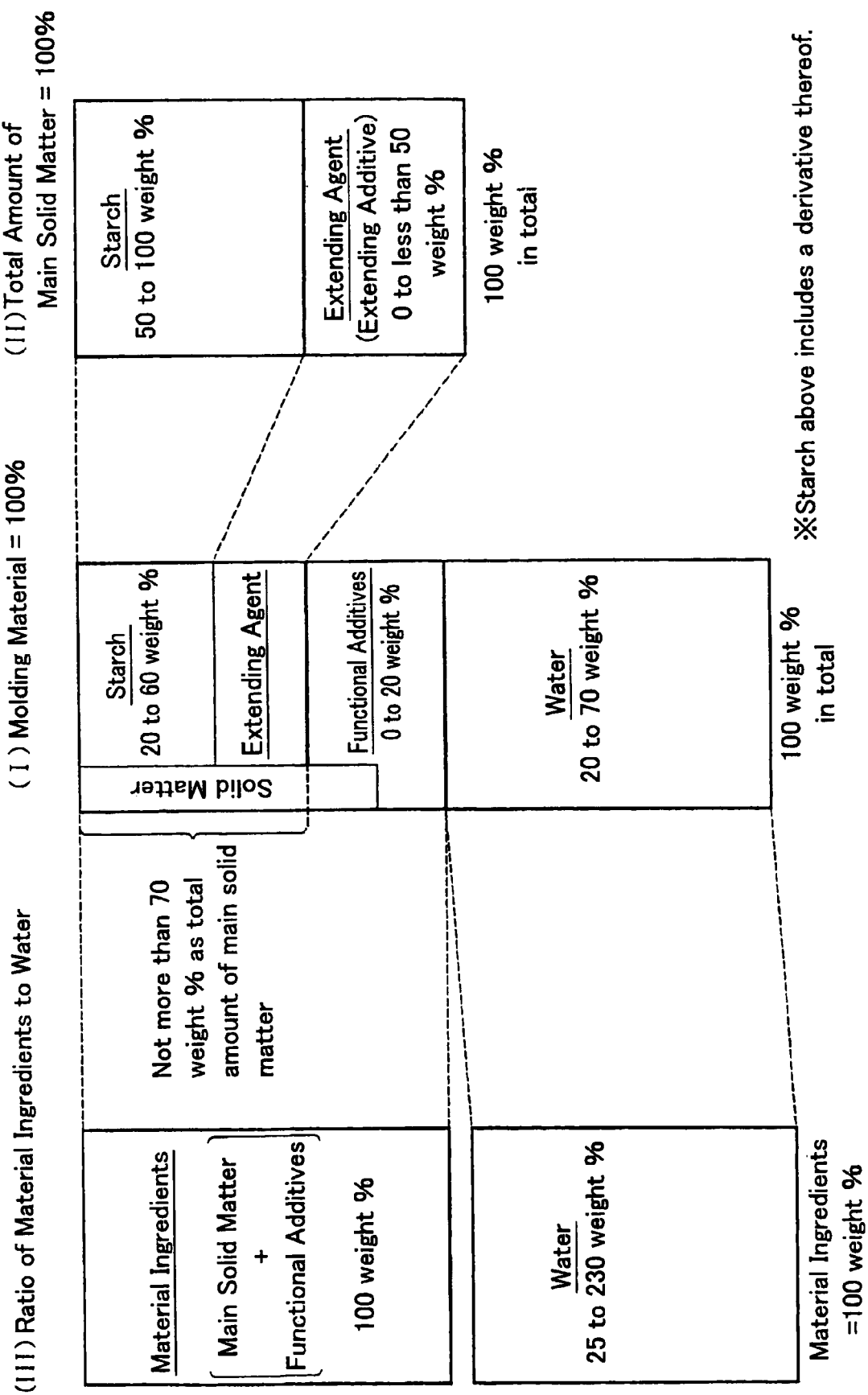
FIG. 4 is a graph that shows a composition of a molding material in the present invention, as measured in relation to the whole molding materials in a graph (I), and a total amount of main solid matter in a graph (II), and by means of a relation between a total amount of the materials and water in a graph (III), and a relationship between those measurement schematically.

As a graph "(II) Total Amount of Main Solid Matter=100%" in FIG. 4 shows, the percentage of starch content in the first molding material is preferably within the range between 50 weight % and 100 weight %, if a total amount of the main solid matter of the molding material is taken as 100 weight %. Meanwhile, if a total amount of the molding material including water is taken as 100 weight %, as a graph "(I) Molding Material=100%" in FIG. 4 indicates, the percentage of starch content is preferably within the range between 20 weight % and 60 weight %. When the starch content falls in the ranges above, the main material of the biodegradable molded article in accordance with the present invention can be regarded as starch, so good biodegradability can be expected. By the way, the main solid matter and the total amount thereof are described later.

Polyvinyl alcohol used for the second molding material is not limited to a particular type, but polymerization degree is preferably not less than 1000, especially preferably not less than 1500.

Saponification degree of polyvinyl alcohol used for the second molding material is preferably not less than 75%, more preferably not less than 90%.

The content of polyvinyl alcohol used in the second molding material molding is preferably not less than 4.0 weight %, more preferably not less than 5.0 weight %, which can improve moisture absorption strength.

Starch used as the main material of the second molding material is not limited to any particular type. For instance, starch easily acquired from agricultural products worldwide as major cereals, such as potato, corn, tapioca, rice, wheat, sweet potato, etc. can be preferably used. The starch above may be either produced from a particular agricultural product or a mixture of starch produced from more than one agricultural product.

Also, a derivative of the starch used as the main material of the second molding material is starch that is chemically modified but still biodegradable, more specifically, such as α-starch, cross linked starch, and denatured starch, etc. Moreover, a mixture of the unmodified starch and the derivative of starch can be used as well. Thus in a broad sense, the starch in the present invention includes unmodified starch (starch in a narrow sense), a derivative thereof, and a mixture of these two. So, in the description below, "starch" indicates the starch in a broad sense, unless particularly notices.

The percentage of starch content in the second molding material is preferably within the range between 50 weight % and 95 weight %, if a total amount of the main solid matter of the molding material is taken as 100 weight %. Meanwhile, if a total amount of the molding material including water is taken as 100 weight %, the percentage of starch content is preferably within the range between 20 weight % and 75 weight %. When the starch content falls in the ranges above, the main material of the biodegradable molded article in accordance with the present invention can be regarded as starch, so good biodegradability can be expected. By the way, the main solid matter and the total amount thereof are described later.

It is preferable that also in the second molding material, starch or a derivative thereof contains high-amylose starch, which can further improve moisture absorption strength. Also, the percentage of high-amylose starch or a derivative thereof in starch or a derivative thereof is preferably not less than 50 weight %, more preferably not less than 60 weight %, and still more preferably not less than 75 weight %, which further improve moisture absorption strength.

Apart from the above essential components (high-amylose starch or a derivative thereof in the first molding material and starch and polyvinyl alcohol in the second molding material), the first molding material and the second molding material (hereinafter, collectively referred to as the "molding material") may include various additives. More specifically, the additives are such as an extending agent, strength adjusting agent, plasticizer, emulsifier, stabilizer, mold releasing agent, homogeneity adjusting agent, moisture retaining agent, handling adjusting agent, conductivity adjusting agent, dielectric loss adjusting agent, swelling agent, coloring agent, etc.

Some additives are beneficial in the manufacturing process of the biodegradable molded article, such as improving efficiency of manufacturing the biodegradable molded article or avoiding problems happening in the manufacturing process, and others are advantageous for the biodegradable molded article as a finished product, such as improving the quality of the acquired biodegradable molded article and cutting costs thereof. The type of these additives is not limited, unless significantly lowering the quality of the expanded molded article or the biodegradable molded article.

The extending agent is an additive added to the molding material to increase the bulk of the molding material and decrease the amount of starch included in the material as much as possible, to cut costs. Therefore, a substance used as the extending agent is not limited to any particular one as long as cheaper than starch, but by-products of processing and manufacturing of foods, etc. are preferred, to dispose the wastes simultaneously.

More specifically, what can be used are:
(1) a remained juice, residue of squeezing, that are produced in food (food and drink) processing and manufacturing using vegetables and fruits such as celery, carrot, tomato, citrus fruits (mandarin orange, lemon, grapefruit, etc.), apple, grape, berries, pineapple, sugarcane, sugarpeat, etc., and mixture of thereof;

(2) by-products of a manufacture of processed foods using cereals, such as bean curd lees and tofu;

(3) sake lees, shouchu lees, beer yeast lees, wine yeast lees, etc. that are produced in processes of producing liquors such as sake, shochu, beer, wine, etc., and any mixture thereof;

(4) residues of used luxury drinks such as coffee, black tea, barley tea, green tea, oolong tea, etc., tea dregs and any mixture thereof;

(5) oil cakes remained after squeezing oil from soybean, corn, rapeseed, sesame, etc., and any mixture thereof;

(6) residues produced in a process to polish cereals such as wheat bran, rice bran, rice husks, etc., and any mixture thereof;

(7) by-products produced in a process to produce starch such as gluten meal, etc.;

(8) baking residues produced in a process of manufacturing sweets and bread such as a cone cup, biscuit, wafer, waffle, and any mixture thereof;

(9) the aforementioned by-products etc. above being dried or crushed.

Furthermore, either one of the substances or any mixture thereof may be used.

The strength adjusting agent is an additive to adjust (especially enhance) the strength of the expanded molded article and the biodegradable molded article. Although the type of the agent is not limited to any particular substance, what are taken as the concrete examples are, for instance:

the aforementioned by-products (1) to (9) taken as the extending agents;

(10) saccharide such as glucose, dextrin, isomerized saccharide, etc., and any mixture thereof;

(11) sugar-alcohols such as sorbitol, mannitol, lactitol, etc., and any mixture thereof;

(12) fats and oils such as vegetable fat and oil, animal fat and oil, processed fat and oil made thereof, etc., and any mixture thereof;

(13) waxes such as carnauba wax, candelilla wax, bees wax, paraffin, microcrystalline wax, and any mixture thereof;

(14) thickener polysaccharide (microbe producing polysaccharide or vegetable polysaccharide, etc.) such as xanthan gum gellan gum, guar gum, locust bean gum, pectin, gum Arabic, karaya gum, tara gum, carrageenan, furcellaran, agar, alginate, water-soluble carboxymethyl cellulose, etc. and salts thereof, and any mixture thereof;

(15) chlorides of metals, such as calcium, sodium, potassium, aluminum, magnesium, and iron; sulfates, organic acid salts, carbonates, hydroxides, phosphates, and other salts of these metals; and any mixture thereof;

(16) insoluble minerals such as quartz powder, diatomaceous earth, talc, silicone, etc., and any mixture thereof;

(17) water-insoluble fibers

(18) structures of inorganic substances such as glass, metal, carbon, ceramic and etc.

(19) natural materials such as a shell, bone powder, eggshell, leaf, wood powder, etc., and any mixture thereof;

(20) calcium carbonate, carbon, talc, titanium dioxide, silica gel, aluminum oxide, non-fiber filler, etc., and any mixture thereof;

(21) fatty acid (stearic acid, lactic acid, lauric acid, etc.), salt such as metal salt of the acid substances, etc., fatty acid derivatives such as acid amide, ether, etc., and any mixture thereof;

(22) other food additives such as glycerin, polyglycerin, propylene glycol, ethylene glycol, glycerine fatty acid ester, polyglycerin fatty acid ester, propylene glycol fatty acid ester, sugar ester, lecithin, sorbitan fatty acid ester, polysorbate, etc., and any mixture thereof;

(23) natural resins such as shellac, rosin, sandarac resin, gutta-percha, dammer resin, etc., and any mixture thereof;

(24) biodegradable resins such as polylactic acid, etc., and any mixture thereof;

(25) acetyltributyl citrate, solution of zirconium salt, alkali solution of ammonium zirconium carbonate, and any mixture thereof. Furthermore, either one of the substances above or any mixture thereof may be used.

It is preferable that the molding material of the present invention may contain water-insoluble fibers (fibers that is insoluble in water) as strength adjusting agent, which can further improve strength, especially pressure strength, and prevent damages at a fall.

The water-insoluble fibers may be inorganic fibers consisting of inorganic materials such as glass, metal, carbon, ceramic, synthetic fibers, vegetable fibers, and animal fibers including silk. Vegetable fibers are preferable since they are biodegradable.

The vegetable fibers are not limited to particular type, for instance; polysaccharide and a derivative thereof such as cellulose, microcrystalline cellulose, (water-insoluble) carboxymethyl cellulose, methyl cellulose, acetyl cellulose, etc.; paper and pulp, natural fibers from cotton, hemp, and other plants and vegetables; animal fibers such as silk, etc., and any mixture thereof. Pulp is the most preferable among these insoluble fibers.

Pulp means fibers constituting conifers, broad-leaf tree, kouzo, mitumata and other plants. The fibers are collected from these raw materials after they are properly processed. Pulp may include virgin pulp or wastepaper pulp.

The percentage of the insoluble fibers content in the molding material is preferably within the range between 2 weight % and 10 weight %, thereby further improving strength. Especially it is possible to further improve pressure strength and prevent damages at a fall more securely.

The plasticizer is an additive to improve fluidity of the molding material and gives flexibility to the acquired expanded molded article and biodegradable molded article. Although the type of the plasticizer is not limited to any particular substance, what are taken as the concrete examples are, for instance:

the aforementioned by-products (1) to (9) taken as the extending agents;

the aforementioned compounds (10) to (21), (23) and (24) that are taken as the strength adjusting agents;

(26) acetylpolybutyl citrate, or sugar-alcohols such as glycerin, polyglycerin, propylene glycol, ethylene glycol, etc., and any mixture thereof.

Furthermore, either one of the substances above or any mixture thereof may be used.

The emulsifier is an additive to mix an oily additive adequately and emulsify the additive to be a oil-drop-in-water shape, provided that the oily additive is added to the molding material. Although the type of the emulsifier is not limited to any particular substance, what are taken as the concrete examples are, for instance:

(27) surface active agents such as glycerine acid ester, polyglycerine acid ester, propylene glycol fatty acid ester, sugar ester, sorbitan acid ester, lecithin, polysorbate, etc., and any mixture thereof.

The stabilizer is an additive to stabilize the state of the processed molding material. Although the type of the stabilizer is not limited to any particular substance, what are taken as the concrete examples are, for instance:

starch (in a narrow sense, not modified) as the main material and a derivative thereof; and the substances taken as the strength adjusting agents such as (10) saccharide, (11) sugar-alcohols, (14) thickener polysaccharide, (17) vegetable fibers and a derivative thereof (except paper), and (21) fatty acid, fatty acid salts, and fatty acid derivatives etc.

Either one of the substances above and any mixture thereof may be used.

The mold releasing agent is an additive to easily release the expanded molded article from the mold and also make the surface of the expanded molded article as smooth as possible. Although the mold releasing agent is not limited to any particular type, what are taken as the concrete examples are, for instance, the substances taken as the strength adjusting agents, such as (12) fats and oils, (13) waxes, (14) thickener polysaccharide, (21) fatty acid, fatty acid salts, and fatty acid derivatives, etc.

Either one of the substances above or any mixture thereof may be used.

The homogeneity adjusting agent is an additive to make homogeneity in the slurry/dough molding material, that is, "grain" (in this case, grain, etc. of a solid matter in the slurry/dough material) of the slurry/dough molding material as fine, smooth and homogeneous as possible. Although the homogeneity adjusting agent is not limited to any particular type, what are taken as the concrete examples are, for instance:

starch (in a narrow sense, not modified) as the main material, and the derivative thereof;

the aforementioned by-products (1) to (9) taken as the extending agents;

the aforementioned components (10) to (25) taken as the strength adjusting agents.

Furthermore, either one of the substances above and any mixture thereof may be used.

The moisture retaining agent makes the expanded molded article include a certain amount of water, and has the same effect as the plasticizer. That is to say, if the expanded molded article mainly made of starch includes a certain amount of water (if retaining moisture), while the brittleness of α-starch is decreased, strength and flexibility thereof are improved. Thus the moisture retaining agent can be used as a plasticizer and a strength adjusting agent as well.

The type of the moisture retaining agent is not limited to any particular substance either. So, what are taken as the concrete examples are, for instance:

the starch (in a narrow sense, not modified) as the main material and the derivative thereof;

the aforementioned by-products (1) to (9) taken as the extending agents; and the substances taken as the strength adjusting agents such as (10) saccharide, (11) sugar-alcohols, (12) fats and oils, (13) waxes, (14) thickener polysaccharide, (15) metallic salts, (17) vegetable fibers and their derivatives, (19) natural materials such as a shell, bone powder, eggshell, leaf, wood powder, etc., and (22) food additives.

Furthermore, either one of the substances above or any mixture thereof may be used.

The handling adjusting agent works as a slurry adjusting agent and is an additive to improve the handling of the slurry/dough molding material. Although the handling adjusting agent is not limited to any particular substance, it is noted that all materials and compounds taken as the plasticizer, the emulsifier, and stabilizer can be used. Either one of the substances above or any mixture thereof may be used.

The conductivity adjusting agent is an additive to adjust a conductivity of the molding material, which is one of the factors to control the state of heating in the case of internal heating as described later, especially in the case of heat molding using the internal heat generated by electric heating, when the expanded molded article is molded. Although the conductivity adjusting agent is not limited to any particular type, what are taken as the concrete examples are, for instance:

(12) fats and oils, (13) waxes, (14) thickener polysaccharide, and (15) metallic salts that are taken as the strength adjusting agents, and (28) water soluble electrolytes such as salts, acid, alkali, alcohol, etc.

Either one of the substances above or any mixture thereof may be used.

The dielectric loss adjusting agent is an additive to adjust a dielectric loss of the molding material, which is one of the factors to control the state of heating especially in the case of heat molding using the internal heat generated by high frequency dielectric heating, when the expanded molded article is molded. Although the dielectric loss adjusting agent is not limited to any particular, what are taken as the concrete examples are, for instance:

the substances that are taken as the strength adjusting agents such as (12) fats and oils, (13) waxes, (15) metallic salts, (16) insoluble minerals, and (17) vegetable fibers and their derivatives;

the substance taken as the conductivity adjusting agent such as (28) water soluble electrolytes; and (29) compounds including zirconium salt such as zirconium salt, solution of ammonium zirconium carbonate, etc., and any mixture thereof.

Either one of the substances above or any mixture thereof may be used.

The swelling agent is an additive to adjust the degree of expansion of the molding material and further the swelling to form the expanded molded article having an appropriate shape for the use. Although the swelling agent is not limited any particular type, what are taken as the concrete examples are, for instance:

(30) formulations including organic swelling agents such as benzenesulfonyl hydrazine compounds, azonitryl compounds, nitroso compounds, diazo acetamide compounds, azocarboxylic acid compounds, etc.;

(31) formulations including ammoniacal swelling agents such as espata, etc.;

(32) formulations including inorganic swelling agents such as sodium bicarbonate, ammonium alum hydrogen tartaric acid, magnesium carbonate, etc.

Either one of the substances above and any mixture thereof may be used.

The coloring agent is an additive to color the whole expanded molded article. Although the coloring agent is not limited to any particular type, what are taken as the concrete examples are, for instance:

(33) inorganic pigments such as titanium dioxide and carbon black, etc.;

(34) natural or synthetic organic dyes such as colorants specified by a color index;

(35) colorants made of natural materials such as a caramel, cacao powder, etc.

Either one of the substances above or any mixture thereof may be used.

Among the additives included in the molding material, a content of the extending agent (may be alternatively termed as an extending additive) is preferably not more than a content of the starch contained in the total amount of the main solid matter in the molding material.

That is to say, although the extending additive (extending agent) may not be necessarily contained, it is preferable if the extending additive is contained not exceeding the content of the starch at the maximum, from the viewpoint to cut the cost of raw materials of the biodegradable molded article in accordance with the present invention and to utilize the wastes as described above efficiently. So the starch that is the main material, and the extending agent that is the extending additive among the additives, are termed together as the main solid matter.

By the way, in the main solid matter, if the extending additive is contained more than the content of the starch, the starch is not virtually the main ingredient of the acquired biodegradable molded article. This should be avoided since the quality of the biodegradable molded article is degraded. Also, the starch and the extending agent are integrally termed as "main solid matter", because "solid matter" included in the biodegradable molded article includes solid matter of functional additives (see a graph "(I) Molding Material=100%" in FIG. 4).

That is, in the present invention, as the graph "(II) Total Amount of Main Solid Matter=100%" in FIG. 4 indicates, assuming that the total amount of the main solid matter (starch and extending agent) is taken as 100 weight %, the content of starch (including the derivatives) is within the range between 50 weight % and 100 weight %, while the content of extending agent is within the range between 0 weight % and 50 weight % (0—less than 50 weight % in the figure).

Moreover, as described beside the graph "(I) Molding Material=100%" in FIG. 4, the total amount of the main solid matter in the first molding material in accordance with the present invention is preferably not more than 70 weight %, assuming that the whole molding material including water is taken as 100 weight %.

Furthermore, among the additives included in the molding material, as the graph "(I) Molding Material=100%" in FIG. 4 shows, a content of each additive (termed as functional additives) except that the extending agent (extending additive) in the first molding material in accordance with the present invention is preferably within the range between 0 weight % and 25 weight %, and more preferably between 0 weight % and 20 weight %, assuming that the whole molding material including water is taken as 100 weight %. Also, an amount of the functional additives when the total amount of the main solid matter is taken as 100 weight %, i.e. an amount of the functional additives with respect to the total amount of the main solid matter is not particularly limited, as long as the amount thereof in the molding material falls in the range as above.

In other words, as is the case with the extending agent, the functional additives are not necessarily contained in the molding material. However, it is preferable if the content of additives is not more than 25 weight % out of 100 weight % of the molding material, to improve performance of the biodegradable molded article. By the way, it is not desirable that the content of the functional additives is not less than 25 weight %, because the additives cannot deliver the expected performance in accordance with the content thereof, and moreover, the performance of the biodegradable molded article may be degraded in some cases.

Provided that the main solid matter (the starch as the main material+the extending agent) and the functional additives are collectively termed material ingredients, the molding material used in the present invention further includes water. In this case, the type of water is not particularly limited as long as industrial water is used.

As shown in the graph "(I) Molding Material=100%" in FIG. 4, when water is added to the molding material, a content of water in the molding material should be within the range between 20 weight % and 70 weight %, more preferably within the range between 25 weight % and 55 weight %, assuming that the molding material is taken as 100 weight %.

In other words, as a graph "(III) Ratio of Material Ingredients to Water" in FIG. 4 shows, provided that the total amount of the material ingredients (main solid matter+functional additives) of the molding material is taken as 100 weight %, the amount of water added is within the range between 25 weight % and 230 weight %, more preferably within the range between 33 weight % and 120 weight %. When the content of the water is within the above range, the molding material is in slurry/dough state.

On the one hand, if the content of the water in the molding material is less than 20 weight %, the molding material is scarcely fluid because of too small water content, so this is not preferable in terms of molding. On the other hand, if the content of the water is more than 70 weight %, the content of the solid matter in the molding material becomes too low because of too large water content, so this is not preferable in terms of molding.

When the molding material is in slurry/dough state, moldability is improved since it becomes easy to make the molding material fill a cavity of the mold, as described later. It also becomes possible to make the expanded molded article after molding contain a certain amount of water, and flexibility of the expanded molded article can be improved, as described later.

By the way, along with the main material, additives, and water that are described above, the molding material may include other additives. The ingredients are determined in accordance with functions to be added to the biodegradable molded article, and hence not particularly limited to any additive.

Furthermore, slurry/dough state in this embodiment is categorized in accordance with fluidity of the molding material for the sake of convenience. Thus the categorization is nothing to do with the content of the water. For instance, assuming that a molding material containing a certain amount of water is in slurry state, the molding material may be transformed to dough form if a content of a stabilizer, a water-absorbing extending agent such as bean curd lees, or pulp, etc. are increased. Similarly, when a binding agent such as protein is added to the molding material, the material sometimes loses a certain degree of fluidity and may be transformed to dough state.

The expanded molded article is molded by using the molding material, as described above. As for the molding method, there is a method to use a mold including a cavity matched with a shape of a desired molded article and consisting at least two parts. The expanded molded article is molded by heating and pressurizing the molding material charged into the cavity of the mold.

One of the arrangements of the mold is that at least two metal parts capable of being detached for removing the expanded molded article after molding article are included.

Figure 5:
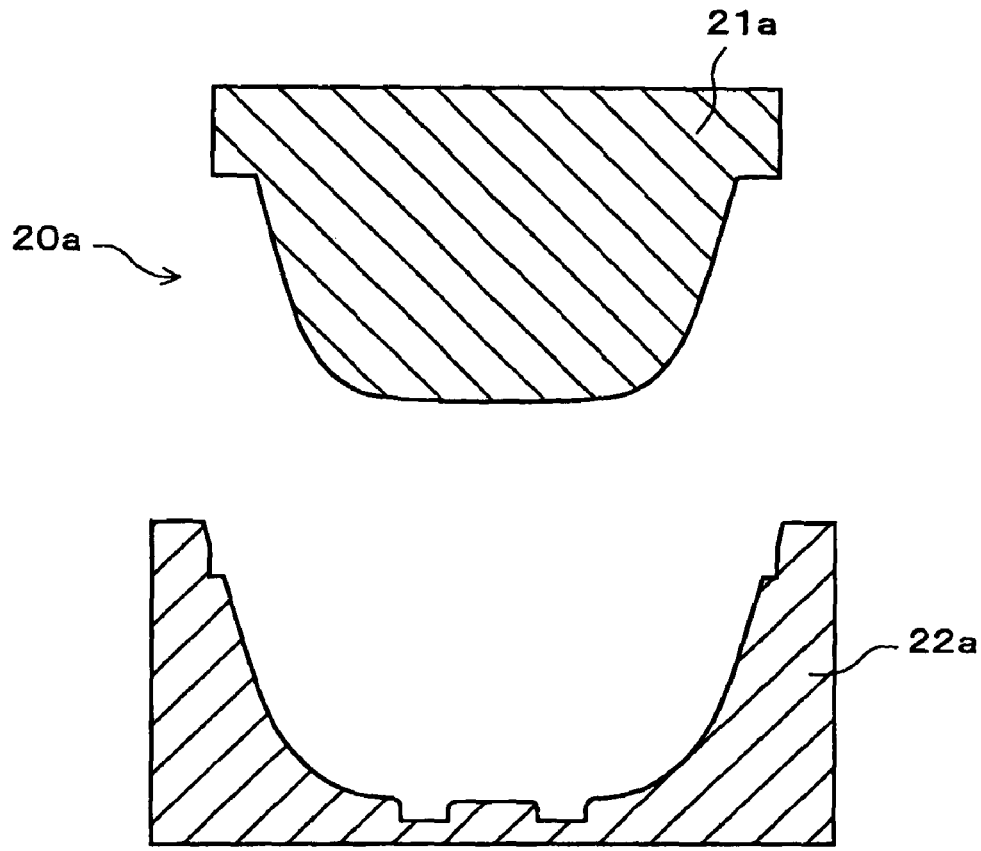
FIG. 5 (a) and FIG. 5 (b) are schematic cross-sectional views showing an arrangement of a mold to mold an expanded molded article that is a main body of the bowl-shaped container shown in FIG. 1 (a) and FIG. 1 (b).
Figure 5:
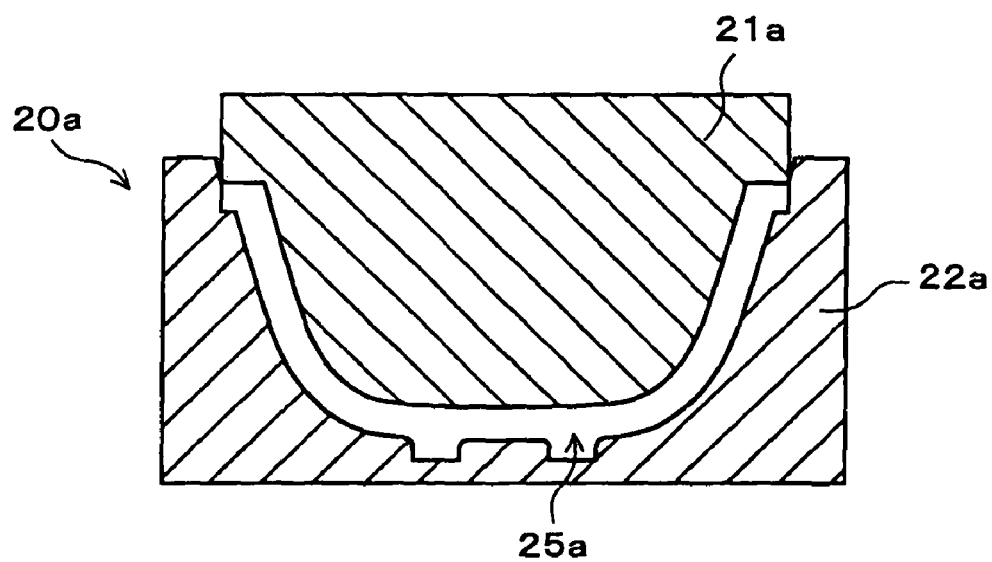
Figure 8:
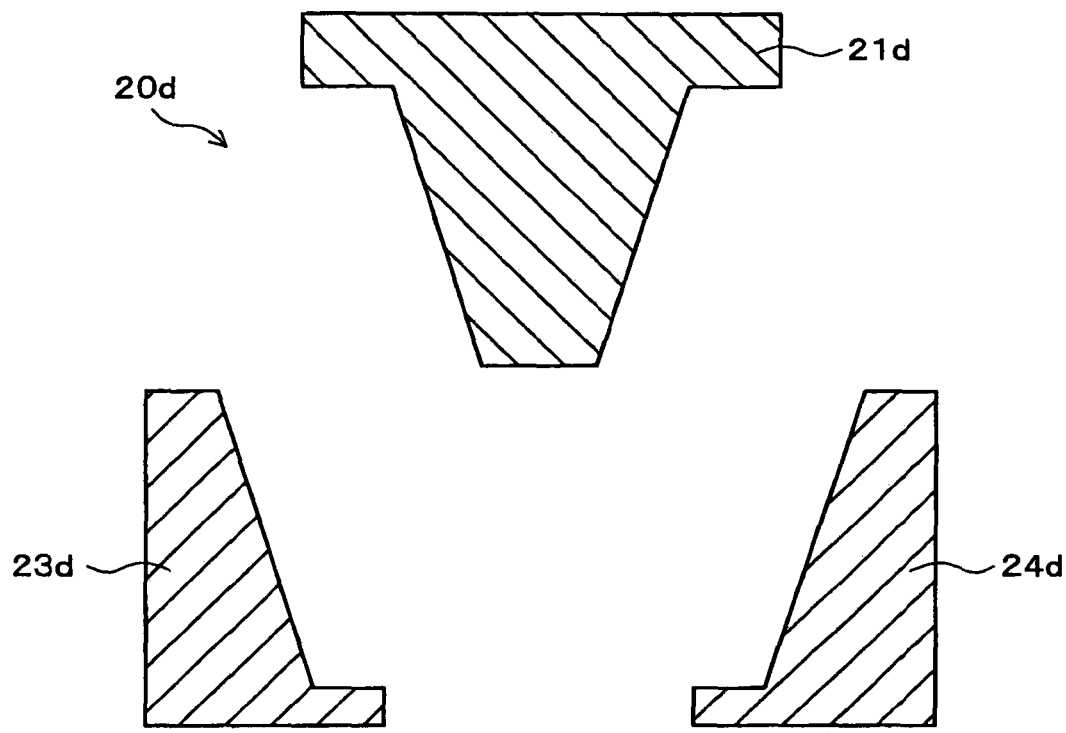
FIG. 8 (a) and FIG. 8 (b) are schematic cross-sectional views showing another arrangement of a mold to mold an expanded molded article that is a main body of the cup-shaped container shown in FIG. 3 (a) and FIG. 3 (b).
Figure 8:
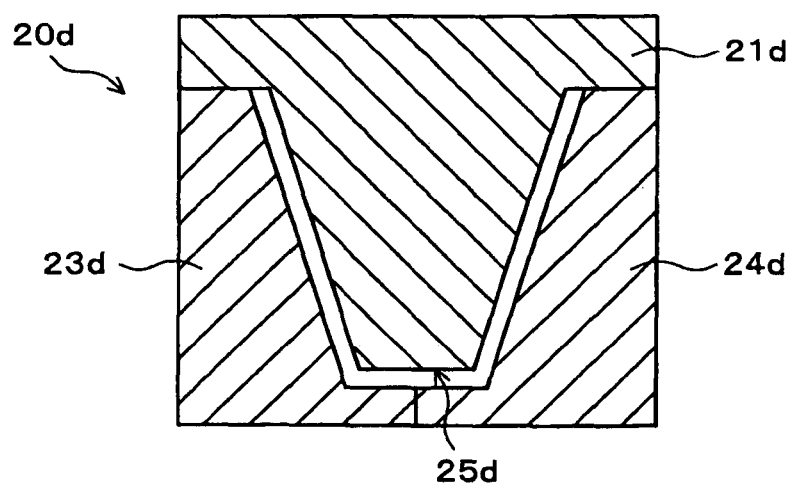

More specifically, examples of the mold are molds shown in FIGS. 5 (*a*), 6 (*a*) and 7 (*a*) such as a metal mold 20*a* including upper and lower metal parts 21*a* and 22*a*, a metal mold 20*b* including parts 21*b* and 22*b*, and a metal mold 20*c* including parts 21*c* and 22*c*, and a metal mold 20*d* shown in FIG. 8 (*a*) including an upper part 21*d* having the same shape as the part 21c and lower parts 23d and 24d having the same shape as the lower part 22c being split in two.

That is to say, the mold of the present invention has to include dividable multiple molds but the style of splitting (i.e. the number of parts) is not particularly limited, since the style depends on the shape of the expanded molded article.

For instance, for the bowl-shaped container 10a and the plate-shaped container 10b, as the metal molds 20a and 20b, the molds split in two, i.e. the upper and lower parts, are preferably used, since these two containers are large in horizontal dimensions. In the meantime, the metal mold 20c, which is split in two (the upper and lower parts) as the metal molds 20a and 20b, is possibly used for the cup-shaped container 10c. However, a three-way split mold such as the metal mold 20d is more suitable than the two-way types such as the metal mold 20c, since the cup-shaped container 10c is taller than the bowl-shaped container 10a and the plate-shaped container 10b.

As shown in FIGS. 5 (b), 6 (b), and 7 (b), cavities 25a, 25b, and 25c matched with the shapes of desired expanded molded articles (see FIG. 1 and FIG. 3) are formed in the metal molds 20a, 20b and 20c, when the upper parts 21a, 21b, and 21c are joined with the lower parts 22a, 22b, and 22c. Similarly, as FIG. 8 (b) shows, a cavity 25d is formed in the metal mold 20d, when the parts 21d, 23d, and 24d are joined.

Moreover, although not illustrated, the metal molds 20a, 20b, 20c, and 20d may include a knockout pin for removing the expanded molded article and a hinge, guide, bar, etc., for movably connecting the parts 21a to 21d, 22a to 22c, 23d, and 24d.

Furthermore, in this embodiment, although the metal molds 20a, 20b, 20c and 20d are taken as examples of the mold, various conventional molds can be used and an appropriately shaped mold can be selected in accordance with a shape of the expanded molded article.

However, as described later, the mold used in the present invention requires heat resistance for the steam expansion molding, and strength and abrasion resistance are also necessary. Furthermore, microwave permeability is required if internal heating is conducted by using microwave. Therefore, molds made of resin or ceramic having microwave permeability, heat resistance, strength, and abrasion resistance are preferably used when the internal heat is generated by using microwave, but otherwise a metal mold is more suitable because the mold itself performs as a part of an electrode in the case of internal heating by using electric conduction or high frequency dielectric heating that are described later.

As for the heating method for the above molding, what can be used are:
  external heating by direct heating means that the mold is directly heated, such as direct heat, far-infrared radiation, electric heater, IH device, etc.; or internal heating by internal heating means that the internal molding material itself is heated, such as electric conductive heating, high frequency dielectric heating, microwave heating, etc.

In the case of the external heating, the mold (metal mold 20a etc.) is directly heated by the direct heating means above. On this account, external heating is performed on the molding material in the cavity (cavity 25a etc.) by the mold, and the expanded molded article is molded through the steam expansion of the molding material.

Figure 9:
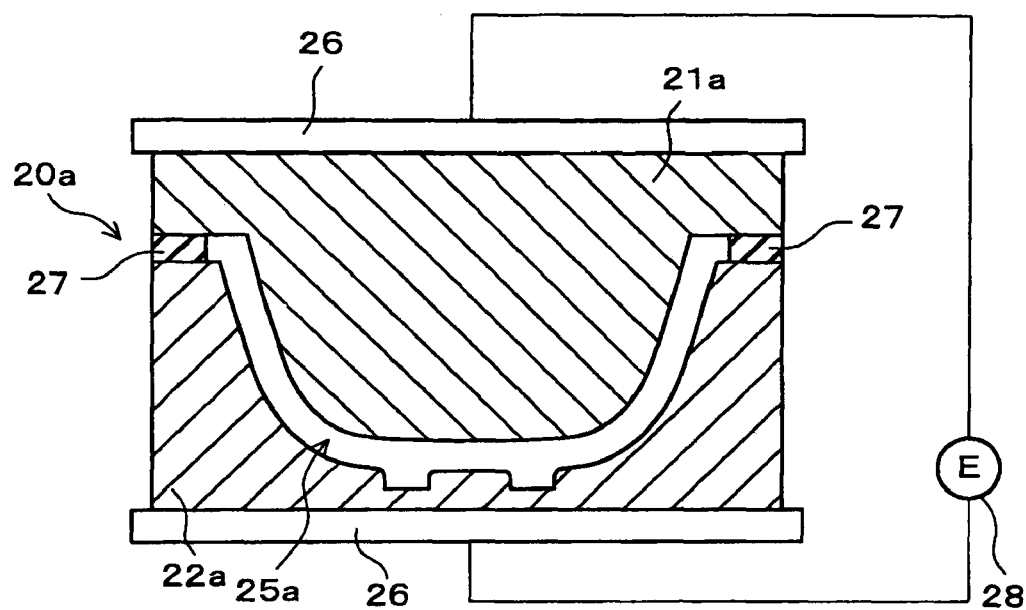
FIG. 9 is a schematic explanatory view showing an example of an arrangement that the mold shown in FIG. 5 (a) and FIG. 5 (b) includes an electrode for internal heating.

In the meantime, a mold having the same shape as that for the external heating can be used for the internal heating. So if the metal mold 20a is taken as the example, as FIG. 9 schematically shows, when the parts 21a and 22a are paired, the mold is possibly arranged so that:
  each of the parts 21a and 22a is connected to an individual electrode 26 and 26, respectively;
  an insulator 27 is provided at contacts between the parts 21a and 22a; and
  the electrodes 26 and 26 are connected to a power supply 28.

On this account, it becomes possible to internally heat the molding material charged in the cavity 25a. By the way, apart from the power supply 28, the electrode 26 is connected to unillustrated switch, control circuit, etc.

It is also possible to apply the arrangement in which the electrode 26 is connected either to the part 21a or the part 22a, for the external heating. That is to say, the arrangement including the direct heating means and the electrode 26 is possibly used to heat the molding material directly, in the case of external heating too. Thus the arrangement shown in FIG. 9, in which the electrode 26 is provided, is possibly used for both internal and external heating.

Although a heating temperature of the heat molding is not particularly limited, it is preferred that the mold is heated within the range between 140° C. and 240° C., in the case of external heating. When the heating temperature of the mold falls within the range above, the slurry/dough molding material in the cavity (cavity 25a etc.) is properly heated and the molded article as solid matter can be acquired. Also, the water contained in the molding material surely be vaporized and bubbles are formed because the range of the temperature is more than 100° C. i.e. the boiling point of water. Thus the expanded molded article can easily be acquired, since the acquired molded article surely achieves the steam expansion.

In the meantime, a heating temperature in the case of internal heating is not particularly limited as long as the heating temperature is in a range at which the steam expansion happens to the molding material, since the molding material itself in the cavity (cavity 25a etc.) is internally heated by applying low frequency alternating voltage or high frequency electric field to the electrode 26, and the heating temperature depends on conditions related to the internal heating.

More specifically, characteristics of the electrode 26, a level of the low frequency alternating voltage, and strength of the high frequency electric field are deeply related to the determination of the conditions. Simultaneously, other major conditions include the conductivity and the dielectric loss of the molding material that are described above, since the heating condition depends on the conductivity of the molding material when the molding material is heated and molded through electric heating, and the heat condition depends on the dielectric loss of the molding material, when the molding material is molded through high frequency dielectric heating.

Practically, the range of the conditions above are not specifically limited, as long as the temperature in the cavity is within the range of the temperature in the case of external heating.

The heating time should be appropriately set depending on the heating temperature and the shape, thickness, etc. of the expanded molded article. It is however preferable if the water content of the expanded molded article after molding falls at least within a specified range. In other words, it is favorable to set the heating time so that the water in the molding material is not almost completely evaporated during the heating time.

When the amount of water in the molding material is less than the specified range of water content (described later) due to long heating time, undesirably the quality of the expanded molded article is reduced, since the expanded molded article is expanded too much as well as cannot contain the specified amount of water, and as a result the expanded molded article becomes hard and brittle.

The heating time is not specifically limited. For instance, while it is possible to mold the expanded molded article in a much shorter time through the high frequency dielectric heating comparing to a conventional external heating, the heating time tends to be longer when a thick expanded molded article is molded. Thus basically the heating time is appropriately determined in accordance with which heating method is used and how the expanded molded article is shaped, although generally it is preferably if the heating time falls within the range of 10 second to 5 minutes.

Pressure applied in the process of heat molding is not particularly limited as well. However, generally, it is preferred if pressure is within the range between 5 kg/cm$^2$ and 50 kg/m$^2$. Of course, this molding pressure is variable with reference to the conditions.

Figure 10:
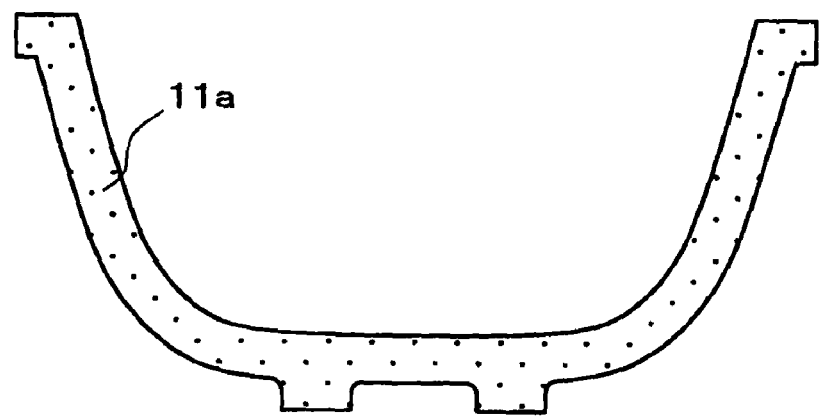
FIG. 10 (a) is a schematic cross-sectional view showing a shape of the expanded molded article molded by the mold shown in FIG. 5 (a) and FIG. 5 (b), FIG. 10 (b) is a schematic cross-sectional view showing a shape of the expanded molded article molded by the mold shown in FIG. 6 (a) and FIG. 6 (b), and FIG. 10 (c) is a schematic cross-sectional view showing a shape of the expanded molded article molded by the mold shown in FIG. 7 (a) and FIG. 7 (b) or FIG. 8 (a) and FIG. 8 (b).
Figure 10:
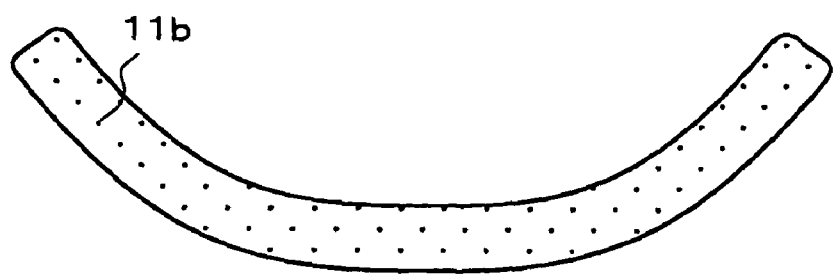
Figure 10:
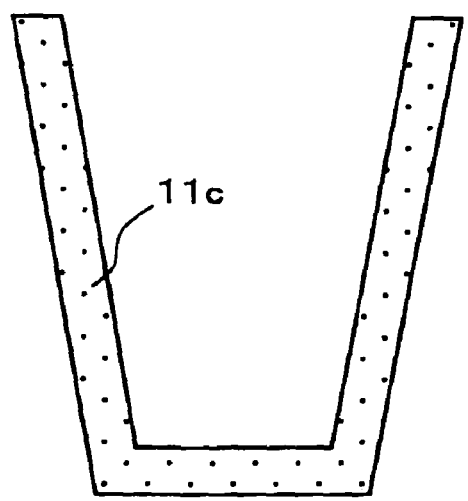

By heating and pressurizing the molding material in the cavities 25a, 25b, 25c and 25d with the metal molds 20a, 20b, 20c, and 20d, respectively, as FIGS. 10 (a), (b), and (c) indicates, main body 11a of the bowl-shaped container, the main body 11b of the plate-shaped container, and the main body 11c of the cup-shaped container are acquired as the expanded molded articles. A final content of water in the expanded molded articles after molding falls within the range between 3 weight % and 20 weight %, more preferably within the range between 3 weight % and 15 weight %.

On the one hand, it is undesirable that the final content of water is less than 3 weight %, because excessively low water content renders the expanded molded article hard and brittle so that the flexibility thereof is reduced. On the other hand, it is also undesirable that the water content is more than 20 weight %, because excessively high water content renders the expanded molded article unnecessarily moist so that the weight thereof is gained and attaching and adhering the coating film 12 become difficult.

As described in the description of the moisture retaining agent, the use of the molded article is seriously limited due to the hardness and brittleness of the same, when starch is simply transformed to α-starch. Thus, in the present invention, it is possible to set water content of the expanded molded article within the range as above by simply molding the same, since enough water is contained in the molding material in slurry/dough state. By the way, sometimes the water content goes a little out of bounds depending on molding conditions and other environmental conditions. In this case, the water content is adjustable by leaving the expanded molded article in a warehouse under a fixed level of humidity for a certain period of time, spraying water to the same, and inversely leaving the same in a dry warehouse for a fixed period of time.

In the biodegradable molded article in accordance with the present invention, the coating film 12 made of biodegradable plastics is attached on the surface of the expanded molded article (the main body 11a, etc.). Attaching the coating film 12 having at least hydrophobicity can impart the expanded molded article at least water resistance. Also, it is preferable if the coating film 12 further imparts gas impermeability, heat insulation, abrasion resistance, improved strength, and flexibility to the expanded molded article.

More specifically, when the biodegradable molded article in accordance with the present invention is used for a highly hermetic preserving container, a gas impermeable coating film 12 is highly preferable, since oxidation of, and moisture absorption by, an article in the container must be avoided.

Moreover, when the biodegradable molded article of the present invention is used for a container of noodles, a coating film 12 with high heat resistance is preferably arranged, since deformation and melting of the biodegradable molded article because of the heat of an article inside the container must be avoided. More specifically, the softening point of the coating film 12 is preferably not less than 130° C., and more preferably not less than 150° C. Also, the melting point of the coating film 12 is preferably not less than 170° C., and more preferably not less than 200° C. Furthermore, it is especially preferable the softening point thereof is not less than 130° C. and at the same time the melting point is not less than 170° C. It is the most preferable that the softening point thereof is not less than 150° C. and at the same time the melting point is not less than 200° C. On this account, deformation and melting of the biodegradable molded article caused by the heat of an article inside the container can be avoided.

The material of the coating film 12 is not specifically limited as long as materials that are able to impart water resistance and preferably gas impermeability to the expanded molded article after the film 12 is attached on the surface thereof.

More specifically, what are used as the materials are those conventionally known as biodegradable plastics such as 3-hydroxybutyric acid-3-hydroxyvaleric acid copolymer, poly-p-hydroxybenzaldehyde (PHB), polybutylene succinate (PBS), polycaprolactone (PLC), acetylcellulose (PH) polymer, polyethylene succinate (PESu), polyester amide, modified polyester, polylactic acid (PLA), Mater-Bi (trademark of Novamont, Italy: having starch as the major ingredient and polyvinyl alcohol resin and aliphatic polyester resin having biodegradability as the minor ingredients), cellulose, and chitosan composite, etc. Either one of the materials above or any mixture of more than one material may be used. Also, accessory materials such as a biodegradable plasticizer, filler, etc. may be added to the biodegradable plastics.

It is preferable that the material of the coating film 12 is modified polyester because of its excellent gas impermeability, moisture permeability resistance, and heat resistance. Also, it is preferable the coating film 12 is biaxially stretched biodegradable film because of its excellent strength, heat resistance, and gas impermeability. Therefore, biaxially stretched modified polyester is the most preferable for the coating film 12.

Furthermore, the coating film 12 may be produced by adding starch to the materials (biodegradable plastics) above. In this case, although a mixing ratio between the biodegradable plastic and starch is not particularly limited as long as qualities of the coating film 12 such as hydrophobicity are not impaired; for instance, what is preferable is more or less 1:1 mixing ratio by weight.

In addition, additives may be added to the coating film 12. More specifically, although the additives are not particularly limited to specific types, what are able to be added are coloring agents, additives capable of improving water resistance, gas impermeability, etc., an additive improving qualities in relation to the softening when the coating film 12 is attached, etc.

Although the thickness of the coating film 12 (thickness of the film) is not particularly limited, it is preferred if the thickness of the film or sheet before attached on the expanded molded article falls within the range between 0.01 mm and a few millimeters.

As described later, the thickness of the coating film 12 becomes below the range above after attached on the surface of the expanded molded article, since the coating film 12 is heated and softened when attached. The thickness of the coating film 12 after attached is set at an appropriate thickness capable of having water resistance, gas impermeability, etc.

in accordance with the type of biodegradable plastics used as the materials, hence not particularly limited. However, preferably the thickness is not more than 80·m, and more preferably not more than 50·m. Although the lower limit is also not particularly limited as long as water resistance and gas impermeability, etc. are acquired, preferably the thickness is not less than 5·m in general.

The expanded molded article preferably accounts for not less than 60 weight % of the total weight of the biodegradable molded article in accordance with the present invention. In other words, the biodegradable plastics preferably account for at least less than 40 weight % of the total weight of the biodegradable molded article in accordance with the present invention.

As described above, the speed of biodegradation of biodegradable plastics is slower than that of starch. More specifically, although the speed of biodegradation of the biodegradable plastics having the same weight greatly varies depending on the type and shape of the biodegradable plastics, generally, the speed of biodegradation of the biodegradable plastics can be considered within the range of some tenths to around a fourteenth, if that of the expanded molded article mainly made of starch is set as one.

Therefore, if the amount of biodegradable plastics included in the biodegradable molded article is too much, biodegradability of the biodegradable molded article on the whole becomes poor, even if the biodegradable plastics have biodegradability. Thus it is highly preferable to stipulate the maximum amount of the biodegradable plastics accounting for in the total weight.

So, in the biodegradable molded article in accordance with the present invention, biodegradable plastics are always used for the coating film 12 and may be used as an adhesive (adhesive layer 13) that is described later. Thus to stipulate the maximum amount of the biodegradable plastics is equivalent to stipulate the maximum amount of the coating film 12 and adhesive layer 13.

However, the adhesive 13 does not always have to be used (for instance, the bowl-shaped container 10a shown in FIG. 1 (*a*)), and moreover, as described later, non-plastic natural materials such as starch are possibly used as the adhesive layer 13. So in the biodegradable molded article in accordance with the present invention, the amount of the biodegradable plastics is stipulated by stipulating the amount of the expanded molded article mainly made of starch.

Since the coating film 12 and the adhesive layer 13 are shaped as film, the biodegradable plastics are easily biodegraded in the biodegradable molded article in accordance with the present invention. Taking this into account, as described above, the maximum weight of the biodegradable plastic (coating film 12 and adhesive layer 13) in the biodegradable molded article of the present invention is stipulated as less than 40 weight %, when the weight of the expanded molded article is set as not less than 60 weight %. As a result, biodegradability of the biodegradable plastics and that of the expanded molded article are well-balanced, so biodegradability of the biodegradable molded article is further improved.

Very good biodegradability can be acquired on the whole, especially since the expanded molded article, having good biodegradability for its expanded structure, lessen the content of the coating film 12 and the adhesive layer 13. Thus when, for instance, the biodegradable molded article of the present invention is used as a food tray, the food tray can be composted together with residues of food without causing any problem.

The weight of the expanded molded article preferably accounts for not less than 60 weight % of the total weight of the biodegradable molded article of the present invention. That is to say, the biodegradable plastics preferably account for at least less than 40 weight % of the total weight of the biodegradable molded article in accordance with the present invention.

In the present invention, there are two arrangements in which the coating film 12 is attached in accordance with a difference of the manufacturing method of the biodegradable molded article. In the first arrangement, the coating film 12 is directly attached on the expanded molded article (for instance, see FIG. 1 (*a*)), and in the second arrangement the film is attached with the adhesive layer 13 in between (for instance, see FIG. 1 (*b*)). In the latter arrangement, an adhesive is required for attaching the coating film 12.

Although the adhesive is not particularly limited as long as having biodegradability and also capable of attaching the coating film 12 to the expanded molded article, specific examples of the adhesive are such as natural glues and binding agents mainly made of starch, protein, or these natural substances mixed with PVA (polyvinyl alcohol), aqueous adhesives, protein refractory/insoluble in water and congealed due to thermal metamorphism, biodegradable plastics (generally synthetic product) having a low melting point and being able to be melted below the melting point of the coating film 12, adhesives having a low melting point such as a mixture of any aforementioned substances, and thermosetting adhesives having fluidity at room temperature.

The aqueous adhesives have the advantage of very high level of biodegradability and safety, since they are mainly naturally occurring substances and basically made of starch, etc. as in the case of the expanded molded article. The use of the aqueous adhesives is not particularly limited. However, generally the coating film 12 is attached after the adhesive is put on the surface of the expanded molded article with a brush or inversely the adhesive is put on the surface of the coating film 12 before the film 12 is attached on the surface of the expanded molded article.

The biodegradable plastics (generally synthetic product) having a low melting point and being able to be melted below the melting point of the coating film 12, and a mixture thereof can also be used as the adhesive with low melting point. In other words, among the biodegradable plastics taken as the concrete examples of the coating film 12, a plastic having a lower melting point than that of the biodegradable plastic used for the outermost layer of the coating film 12, more specifically, melted either at temperature lower than the softening point of the coating film 12 or within the range between the softening point of the coating film 12 and the melting point of the coating film 12, can be selected accordingly.

For instance, when a film mainly made of polylactic acid, modified polyester and the like are used as the coating film 12, since the melting points of these substances are within the range between 80° C. and 100° C., polycaprolactone whose melting point is within the range between 60° C. and 70° C. is preferably used as the adhesive with a low melting point.

The biodegradable plastics having a low melting point is generally used in film-shape. That is, the biodegradable plastics having a low melting point is highly suitable for use as an adhesive film. As described later, the coating film 12 is heated pressure-pressed and attached on the expanded molded article by using the attaching mold. So if the adhesive film made of the biodegradable plastics having a low melting point is arranged between the coating film 12 and the expanded molded article in the step above, the adhesive works well, since the biodegradable plastics having a low melting point is melted by the heat and pressure pressing.

As the adhesive used in the present invention including the aqueous adhesive and the biodegradable plastics having a low melting point, adhesives not including a volatile organic solvent are suitable. The organic solvent is unfavorable because, if the same is used, a device to prevent volatilization and diffusion, etc. of the organic solvent has to be provided and thus the manufacturing facilities have to be upsized.

Now, a manufacturing method of the biodegradable molded article in accordance with the present invention is described.

There are two methods of manufacturing the biodegradable molded article in accordance with the present invention. The first one is a method that after a molding material is molded to be a specifically shaped expanded molded article through a steam expansion, a coating film is attached (termed as after attaching method). The second one is a method that molding a molding material through steam expansion and attaching a coating film are done at the same time (termed as simultaneous attaching method).

First, the after attaching method is described. This method at least includes two steps of:
  molding a specifically shaped expanded molded article (such as the main bodies 11a, 11b, 11c, etc.) from the molding material through the steam expansion; and
  attaching to compress-bond the coating film 12 on the surface of the expanded molded article after the coating film 12 is heated and softened.

Figure 1:
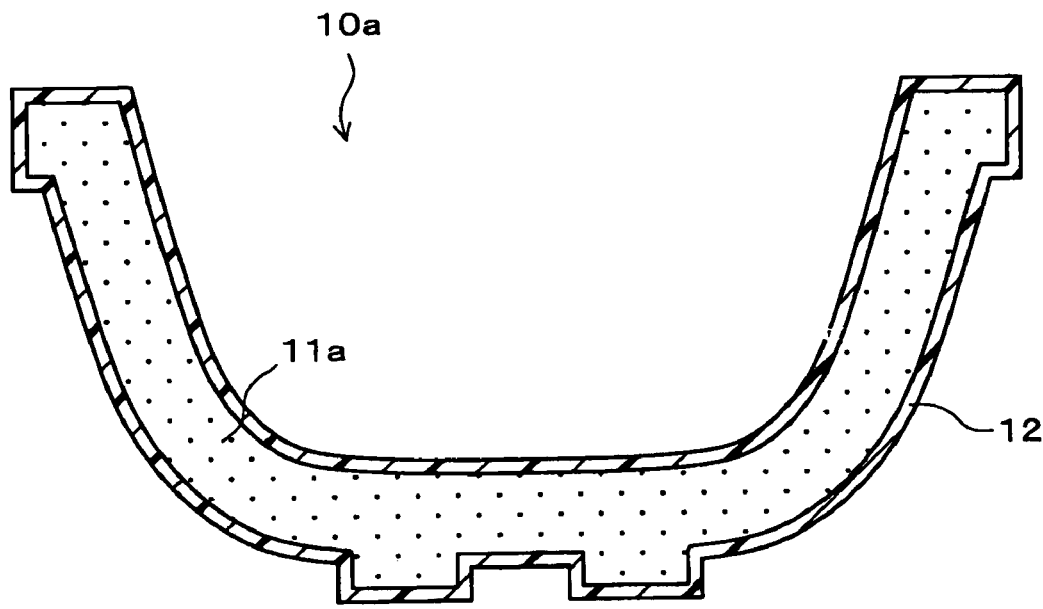
FIG. 1 (a) and FIG. 1 (b) are schematic cross-sectional views showing a shape of a bowl-shaped container as an example of a biodegradable molded article of an embodiment in accordance with the present invention.
Figure 1:
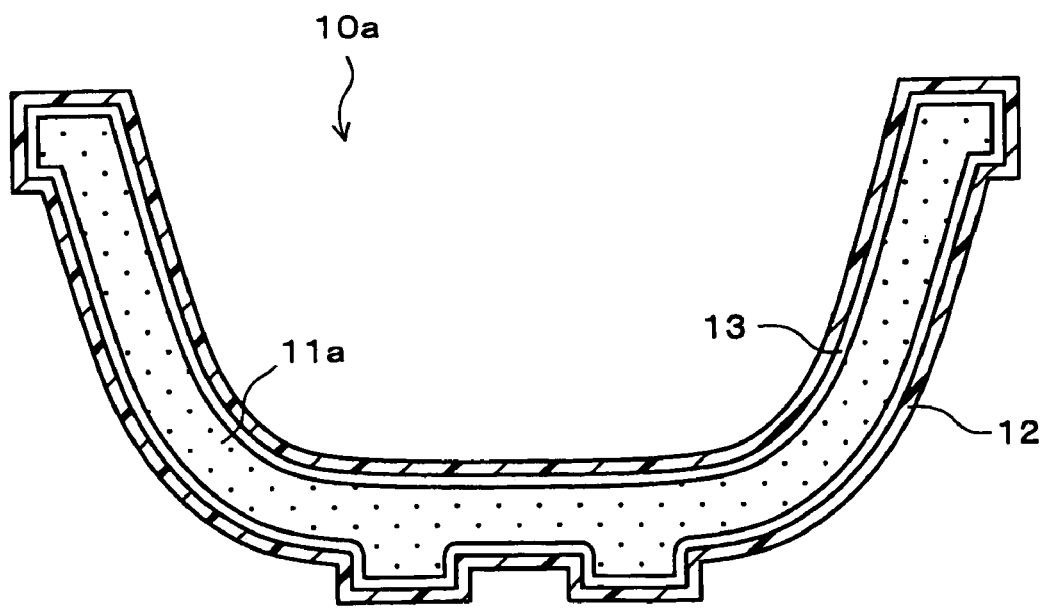

The biodegradable molded articles acquired by using this method are arranged to have the adhesive layer 13 between the coating film 12 and the expanded molded article (the main bodies 11a, 11b, and 11c), as shown in FIGS. 1 (b), 2 (b), 3 (b), etc.

On this account, the biodegradable molded article with a water content that gives enough strength to the same and arranged so that the coating film 12 is steadily attached on the main body (expanded molded article) containing a stable water content can be acquired.

So, when the coating film 12 is attached, an attaching mold, having substantially identical shape as that of a mold (metal mold 20a, etc.) for molding the expanded molded article is used. For instance, as shown in FIG. 11, a mold 30 having substantially identical shape as that of the metal mold 20a is used, when the coating film 12 is attached on the main body 11a to produce the bowl-shaped container 10a.

The shape of the attaching mold does not have to be completely matched with the outside shape of the expanded molded article, as long as being capable of guiding the coating film 12 to be attached on the surface of the expanded molded article adequately. So, generally a copy of the mold of the expanded molded article is used. On this account, it becomes possible to produce the attaching mold at low cost and to attach the coating film 12 certainly and easily, even on a complicatedly shaped expanded molded article. As a result, this allows to manufacture the biodegradable molded article in simpler procedure.

The shape of the attaching mold is not particularly limited as long as the attaching mold has substantially identically shaped cavity as that of the mold. However, if two layers of films, that is, the coating film 12 and the adhesive film, are attached, the heating means is provided as in the case of the mold, to melt the adhesive film with certainty. Thus, for instance, it is possible to use the metal mold 20a without any modification as the attaching mold, shown in FIGS. 5 (a), (b), or 9, to attaching the film 12, when the bowl-shaped container 10a is manufactured.

Figure 11:
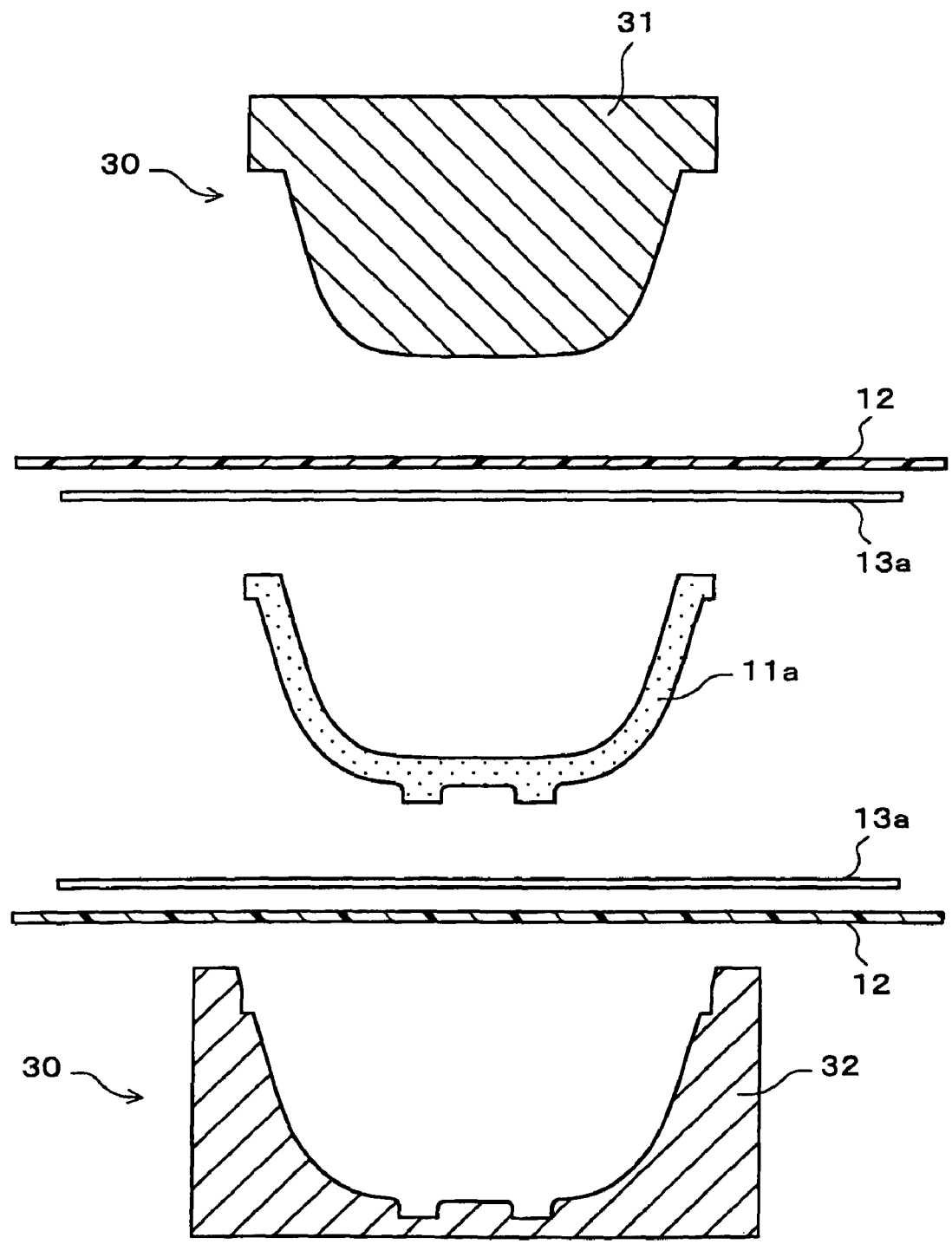
FIG. 11 is a schematic explanatory view describing an attaching step that a coating film is attached on the surface of the biodegradable expanded molded article shown in FIG. 10 (a) by using an after attaching method.

Provided that a concrete example of the attaching method is described, first of all, as shown in FIG. 11, the main body 11a of the bowl-shaped container, which is an expanded molded article, is arranged with respect to the mold 30, and also the coating film 12 is arranged on a part of the mold 30 corresponding to the surface of the main body 11a where the coating film 12 is to be attached.

FIG. 11 shows an example to attach the coating film 12 to the whole expanded molded article. Above a part 32, which is a below part of the mold 30, the coating film 12 is arranged. The main body 11a is provided above the film 12, then above the main body 11a the coating film 12 is arranged again, and further above, a part 31, which is an upper part of the mold 30, is arranged. In other words, the main body 11a is sandwiched between two coating films 12.

Furthermore, when the biodegradable plastics having a low melting point is adopted as the adhesive, as FIG. 11 shows, the adhesive film 13a made thereof is provided between the coating film 12 and the main body 11a. That is to say, above the lower part 32, the coating film 12, the adhesive film 13a, the main body 11a (expanded molded article), the adhesive film 13a, and the coating film 12, are arranged in that order. By the way, in FIG. 11, spaces are left between the films and between the molded article and the film, for convenience of description.

After the step above, temperatures of the parts 31 and 32 are preset between not less than the softening point of the coating film 12 and less than the melting point thereof in advance, and then the coating film 12 is attached on the surface of the main body 11a by pressing the upper part 31 and the lower part 32 from both above and below and exerting appropriate pressure on the parts 31 and 32. At this moment, since the adhesive film 13a is melted at a temperature not higher than the softening point of the coating film 12, the melted adhesive film 13a is fused and adhered to the surface of the main body 11a and becomes the adhesive layer 13, then on the same, the coating film 12 is attached.

By the way, if a biodegradable plastic, melted at a temperature between the softening point of the coating film 12 and less than the melting point thereof, is adopted as the adhesive film 13a, heating temperature of the parts 31 and 32 also have to be set between the softening point of the coating film 12 and the melting point thereof.

The exerted pressure when the coating film 12 is attached is not specifically limited if it is set depending on type of adhesive used, but what is preferable is such relatively high pressure that the thickness of the expanded molded article is reduced. On this account, it becomes possible to make adhesion of the coating film 12 better thanks to the adhesive layer 13 and also to make the thickness of the biodegradable molded article (bowl-shaped container 10a in FIG. 1 (b)), which is the final molded article, thinner. Therefore, it is possible to improve stackability (easiness to stack cups and the number of cups when stacked to a specified height) of the biodegradable molded article.

When the after attaching method is adopted in the manufacturing method of the present invention, as described above, it is especially preferable that the adhesive film 13a is used for the adhesive to attach the coating film 12. When this method is used, it becomes possible to omit the step to apply the adhesive on the surface of the expanded molded article and the manufacturing method of the biodegradable molded article is further simplified, since providing the adhesive film 13a before attaching the coating film 12 is all that is needed in this method.

That is to say, the expanded molded article (main body 11a, etc.), which is the main body of the biodegradable molded article of the present invention, is clearly hydrophilic, because the molded article is mainly made of starch and contains a certain amount of water. Meanwhile, as already described, the coating film 12 is hydrophobic. Thus it is highly likely that the coating film 12 is not sufficiently attached to the expanded molded article, when the film 12 is simply attached by using the after attaching method.

Figure 12:
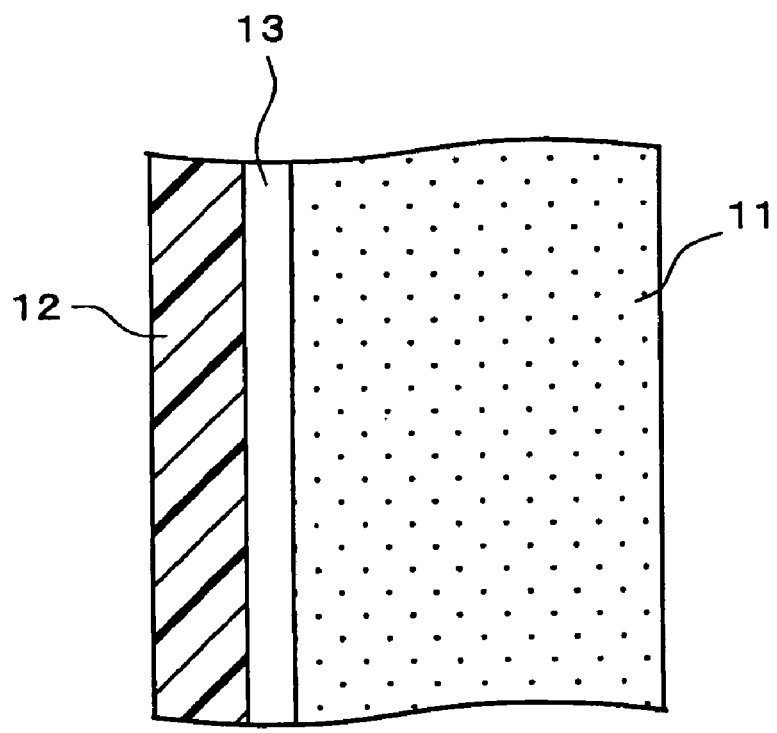
FIG. 12 (a) is a schematic explanatory view showing an attaching state of the coating film on the surface of the biodegradable molded article on which the coating film is attached by using the after attaching method, and FIG. 12 (b) is a schematic explanatory view showing an attaching state of the coating film on the surface of the biodegradable molded article on which the coating film is attached by using a simultaneous attaching method.
Figure 12:
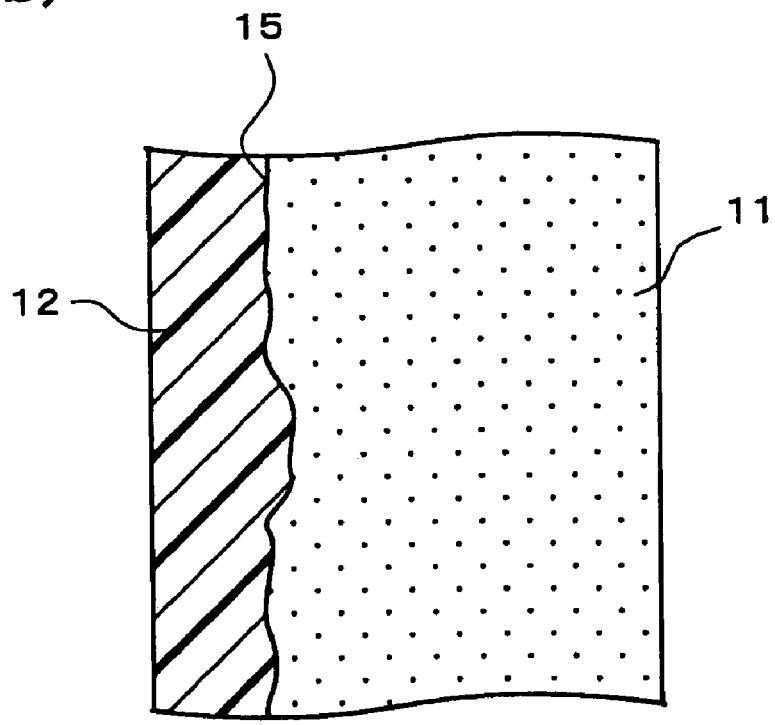

On the contrary, if the coating film 12 is attached by using the adhesive film 13a, as FIG. 12 (a) shows, the coating film 12 is certainly attached to the hydrophilic expanded molded article 11 with the adhesive layer 13 in between. As a result, it becomes possible to stabilize the attaching condition of the coating film 12 in the biodegradable molded article in accordance with the present invention, and also to further improve water resistance and gas impermeability of the same.

By the way, in the after attaching method, it is possible to use as the coating film 12, what are preshaped substantially identical with outside shape of the resulting biodegradable molded article such as a molding film, a film part, an outside shape film, etc. that are used in the simultaneous attaching method descried later.

In this manner, the coating film is not ripped in the step of attaching, if the coating film is molded in a shape substantially identical with the outside shape of the biodegradable molded article in advance, hence this enables manufacture of the biodegradable molded article with deep draw depth properly. The molding film, the film part, and the outside shape film are described in detail in the description of the simultaneous attaching method.

Now, the simultaneous attaching method is described. As described above, this method includes at least a simultaneous molding and attaching step in which the molding material is molded through the steam expansion and at the same time the coating film 12 is attached. The biodegradable molded article acquired by using this method is arranged so that the coating film 12 is formed directly on the surface of the expanded molded article (main bodies 11a, 11b, and 11c), as shown in FIGS. 1 (a), 2 (a), 3 (a), etc. Comparing to the aforementioned after attaching method, this simultaneous attaching method has advantages as follows.

Firstly, the number of the steps can be reduced. That is, it is possible to reduce the steps in comparison to the after attaching method requiring at least two steps to attach the coating film 12, since the simultaneous attaching method is capable of attaching the coating film 12 virtually in one step. Moreover, it is possible to reduce the manufacturing time thanks to the capability of attaching in one step. As a result, it becomes possible to manufacture the biodegradable molded article of the present invention more efficiently.

Secondly, the attaching mold becomes unnecessary. That is to say, in the simultaneous attaching method, attaching the coating film 12 is done concurrently with molding the expanded molded article (main body 11a, etc.) by using the mold (metal mold 20a, etc.). Thus the attaching mold (mold 30 shown in FIG. 11, etc.) for attaching the coating film 12 in the after attaching method is unnecessary. On this account, it becomes possible to cut costs for the manufacturing facilities and also to downsize the facilities, since the attaching facilities including the attaching mold becomes unnecessary.

Thirdly, it becomes unnecessary to use adhesives. That is, in the simultaneous attaching method, since the coating film 12 is attached concurrently with molding the expanded molded article, the coating film 12 is substantially bonded to the surface of the expanded molded article (main body 11a, etc.) Thus it becomes possible to cut costs of the material of the adhesive and also to further improve biodegradability of the biodegradable molded article, since the omission of the adhesive induces a higher content of starch in the biodegradable molded article.

Fourthly, the attaching condition of the coating film 12 is as stable as that of the coating film 12 using the adhesive film 13a in the after attaching method, since the coating film 12 is substantially bonded to the expanded molded article.

As already described, while the expanded molded article such as main body 11a is hydrophilic, the coating film 12 is hydrophobic. Thus it is highly likely that the coating film 12 is not sufficiently attached to the expanded molded article, when the film 12 is simply attached on the expanded molded article.

However, in the simultaneous attaching method, the coating film 12 is attached concurrently with the steam expansion molding of the molding material, at a temperature at least between not less than the softening point of the biodegradable plastic that is the main ingredient of the coating film 12 and less than the melting point of the biodegradable plastic. Hence the heated and pressurized coating film 12 faces the expanded molded article in the step of expansion. So the softened coating film 12 receives pressure of the mold from outside and that of the expanded molded article in the step of expansion from inside so as to closely contact with the expanded molded article. As a result, the coating film 12 is fused and attached on the surface of the expanded molded article.

On this account, as shown in FIG. 12 (b), the boundary surface 15 of a layer of the coating film 12 and the surface of the expanded molded article 11 in a cross section of the acquired biodegradable molded article does not become a smooth surface created by the simple attaching (see the condition in the after attaching method in FIG. 12 (a)) but becomes, for instance, an irregular surface with bumps and dips, so the coating film 12 is adequately adhered to the expanded molded article 11. Consequently, the attaching condition of the coating film 12 becomes highly strong and as stable as the condition of the attaching by the adhesive layer 13. Thus it is possible to further improve the water resistance and the gas impermeability of the acquired biodegradable molded article.

By the way, although the boundary surface 15 of the layer of the coating film 12 and the surface of the expanded molded article 11 is schematically described as, for instance, an irregular surface with bumps and dips in FIG. 12 (b), of course the state of the surface 15 is not limited to this, and the surface 15 possibly takes various forms depending on the ingredients of the coating film 12 and the expanded molded article 11, or conditions of the simultaneous attaching method, etc. Therefore, in the present invention, the attaching condition of the layer of the coating film 12 and the expanded molded article 11 of the biodegradable molded article acquired by the simultaneous attaching method is not particularly limited as long as these two are almost completely adhered.

Taking these four advantages into account, adopting the simultaneous attaching method makes it possible to provide the biodegradable molded article at lower cost, since the biodegradable molded article of the present invention, having the same quality as the one manufactured by the after attaching method, can be manufactured more efficiently and at lower cost than using the after attaching method. Hence this makes it easier to utilize the biodegradable molded article of the present invention for the disposal use.

However, it is sometimes difficult to apply the simultaneous attaching method, depending on the type of the coating film 12, the composition of the molding material, etc. In this case, the after attaching method is very preferably used. In other words, each of the after attaching method and the simultaneous attaching method has advantages thereof, thus the methods are appropriately selected in accordance with the situation. So both of the methods have benefits and advantages as the manufacturing methods of the biodegradable molded article in accordance with the present invention.

Now, the simultaneous attaching method is a method that the coating film 12 is softened at the temperature within the range between less than the melting point and not less than the softening point at the same time with the steam expansion molding of the molding material, and then the coating film 12 is attached concurrently with molding the expanded molded article. Thus it is required to set the conditions of the heating method with respect to the coating film 12 to be attached appropriately.

That is to say, since heating at a temperature not less than 100° C. is simply required to mold the molding material through the steam expansion, a biodegradable plastic whose melting point is not less 100° C. should be selected as the main ingredient of the coating film 12, if the external heating is adopted as the heating method. If the coating film 12 is mainly made of the biodegradable plastic whose melting point is not more than 100° C., the coating film 12 is completely melted at a temperature for sufficient steam expansion molding of the molding material. Hence it becomes impossible for the coating film 12 to be film-shaped or sheet-shaped, so a uniform layer of the coating film 12 without any gaps and holes cannot be formed on the surface of the expanded molded article.

In the meantime, it is preferable to use the coating film 12 mainly made of the biodegradable plastic whose melting point is not less than 100° C., even in the case of using the internal heating as the heating method. However, it is possible to use the one having relatively low melting point, compared to the external heating.

The molding material itself is heated in the case of the internal heating. Thus the coating film 12 is heated by the molding material that is in the step of the expansion molding and under high temperature conditions, and then attached on the surface of the expanded molded article. Hence using the internal heating permits the use of the coating film 12 mainly made of a biodegradable plastic having relatively low melting point, since the coating film 12 is not directly heated by the mold.

Dielectric heating is particularly suitable for the internal heating. By the dielectric heating, the molding material is rapidly heated in an early stage of the expansion molding and the whole of the molding material is expanded altogether. Because of this, pressure to press the coating film 12 against the mold is generated strongly as well as evenly. Also, controlling the temperature of the mold and the heat generation of the mold allows to raise the temperature of an adhesive surface (surface to be bonded with the coating film) of the expanded molded article to near the melting point, while keeping the temperature of a mold contact surface (surface to contact with the mold) below the melting point. As a result of these features, it becomes possible to acquire a biodegradable molded article in which the expanded molded article and the coating film 12 are intensely adhered.

The dielectric heating is a method to heat an object by means of dielectric loss of the object. There are different types of dielectric heating, such as:

high frequency dielectric heating in which high frequency wave (HF; 3 to 30 MHz) is fed to an object (dielectric) to dielectrically heat the same; and microwave heating in which microwave (HF; 1 to 100 GHz) is fed to an object (dielectric) to dielectrically heat the same.

Of the methods above, the high frequency dielectric heating is more suitable because the dielectric heating can be done by using a metal mold as an electrode and heating of the molding material can be easily controlled under precise control by an output device (high frequency generator).

Meanwhile, in the case of the external heating, the coating film 12 is heated to very high temperature to conduct the expansion molding of the molding material sufficiently, because, in this method, after the coating film 12 is directly heated by the mold, the molding material located further inside is heated. Hence it is preferred if the coating film 12 has a higher melting point, and the heating temperature of the mold should be adjusted more precisely, in consideration of the melting point and softening point of the coating film 12.

Therefore, in the case of the simultaneous attaching method, the internal heating has higher versatility as the heating method of the simultaneous attaching method, in terms of easier attaching and wider choice of the coating film 12, etc.

However, the external heating has advantages in that the softening of the coating film 12 and the adhesion thereof to the surface of the expanded molded article are easily controllable, since the coating film 12 is directly heated by the mold. Also, in case of the coating film 12 having a high softening point, when the molding material is heated enough to melt the coating film 12 by using internal heating, the expanded molded article might be degraded due to over expansion molding and so on, depending on the kind of molding materials. Hence external heating may be preferred in the case. In this manner, in the case of the simultaneous attaching method, the external heating and the internal heating have each own advantage as the heating method, thus the heating method is not particularly limited but appropriately chosen to use either of the external heating, the internal heating, or both.

It is possible to classify the simultaneous attaching method, for instance, under seven types (eight types if a variation is included) as below, depending on the use of the coating film 12 when attached.

[Method 1]

As in the case of the attaching step of the coating film 12 in the after attaching method above, the method 1 is a method that the molding material is inserted between the coating films 12 which are not formed and are still sheet-shaped, then the coating film 12 is attached to the expanded molded article which is simultaneously molded though the steam expansion molding. This method is particularly preferred for molding a horizontally long and wide biodegradable molded article such as the plate-shaped container 10b shown in FIG. 2 (*a*), in correspondence with a sheet-shaped coating film 12.

Figure 6:
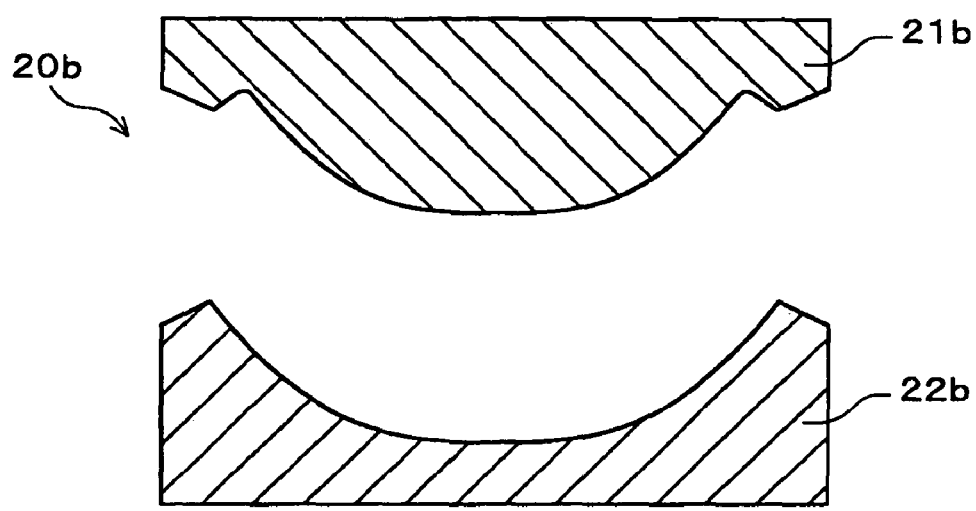
FIG. 6 (a) and FIG. 6 (b) are schematic cross-sectional views showing an arrangement of a mold to mold an expanded molded article that is a main body of the plate-shaped container shown in FIG. 2 (a) and FIG. 2 (b).
Figure 6:
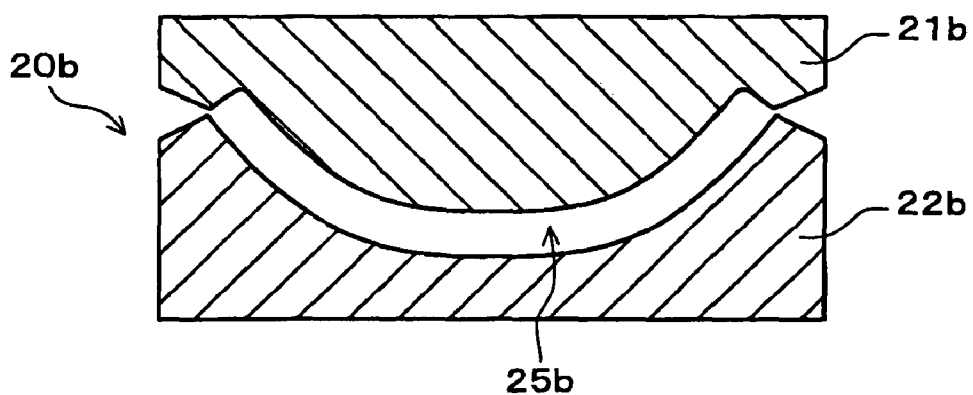
Figure 7:
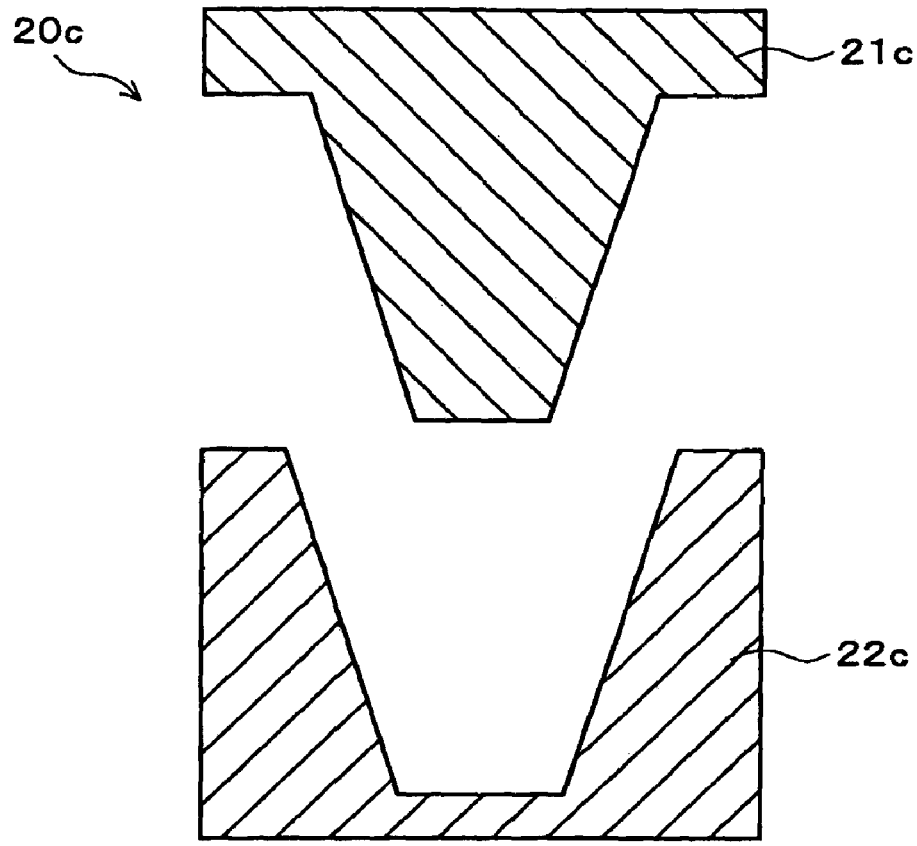
FIG. 7 (a) and FIG. 7 (b) are schematic cross-sectional views showing an arrangement of a mold to mold an expanded molded article that is a main body of the cup-shaped container shown in FIG. 3 (a) and FIG. 3 (b).
Figure 7:
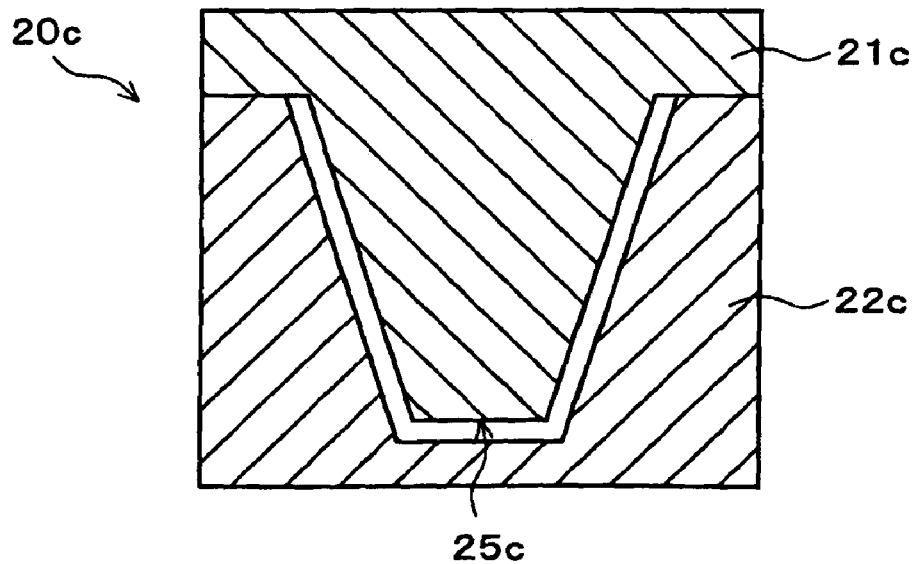
Figure 13:
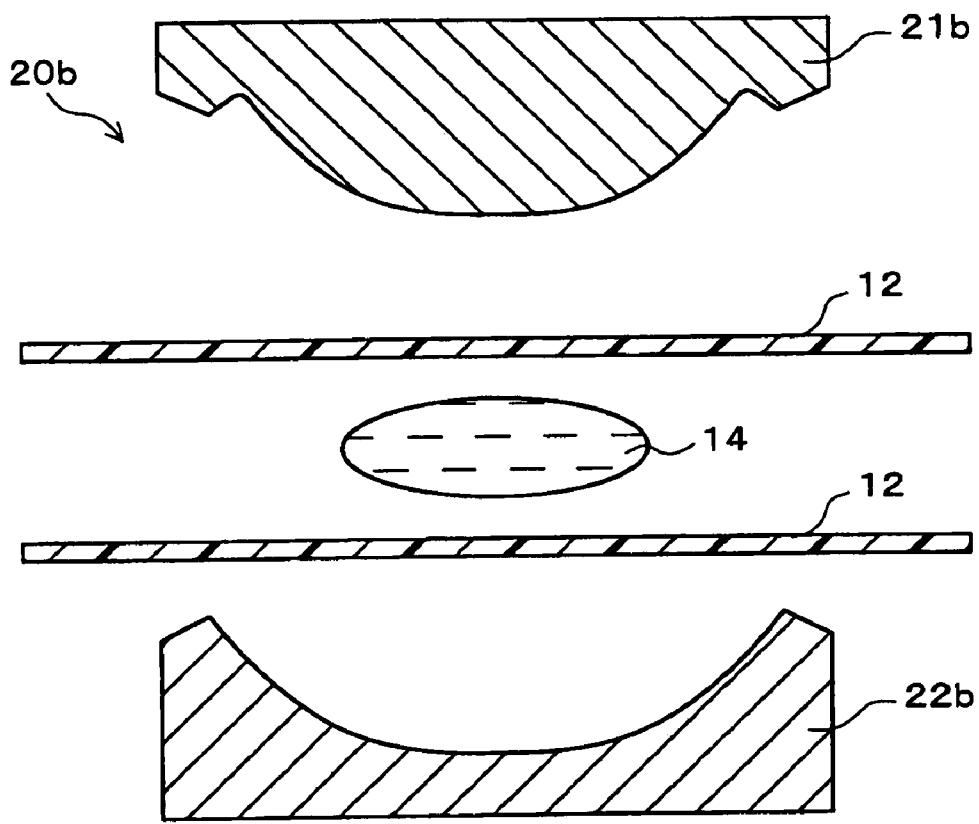
FIG. 13 is an explanatory view describing a case that a manufacturing method 1 is used, in the simultaneous attaching method for manufacturing the biodegradable molded article shown in FIG. 2 (a).

To describe the method 1 concretely, as FIG. 13 shows, the metal mold 20b shown in FIGS. 6 (*a*), and 6 (*b*) is arranged so that two sheet-shaped coating films 12 are provided between the upper and lower parts 21b and 22b, and further the slurry/dough molding material 14 is provided between the coating films 12 and 12. At this moment, the metal mold 20b is heated to less than the melting point of the biodegradable plastic that is the main ingredient of the coating film 12. Then the upper and lower parts 21b and 22b are paired up and heated and pressurized to be molded, by the external heating and/or the internal heating. It is possible to acquire the plate-shaped container 10b (see FIG. 2 (*a*)) as the biodegradable molded article of the present invention only by this step.

[Method 2]

Method 2 is similar to the method 1, except that the coating film 12 is preformed to be substantially matched with an outside shape of the biodegradable molded article in advance. This method can be preferably used for a biodegradable molded article with a relatively deep draw depth, i.e. vertically tall shape, such as the bowl-shaped container 10a shown in FIG. 1 (*a*).

Some types of the coating films 12 cannot be stretched extensively, depending on the type of the main ingredient thereof, i.e. the biodegradable plastic. Hence if method 1 is employed to mold the biodegradable molded article with the deep draw depth such as the bowl-shaped container 10*a* shown in FIG. 1 (*a*), the coating film 12 might be ripped and not be able to cover the expanded molded article sufficiently. So a molding film, which is the coating film 12 being preformed similar to the desired shape in advance, is prepared. On this account, the coating film 12 can cover expanded molded articles having more complicated shape and the deep draw depth certainly and efficiently.

Although the forming method of the coating film 12 is not particularly limited and conventional methods to form sheet films are used, various forming methods, for instance, vacuum forming, injection molding, blow molding, etc. are preferably used. By the way, it is not necessary to shape the coating film 12 precisely identical to the molded biodegradable molded article, as long as the shape of these two are substantially similar to each other. It is sufficient that the coating film 12 is roughly identical with the shape of the biodegradable molded article after molding, i.e. the shape of the mold, inasmuch as the coating film 12 has some flexibility.

Figure 14:
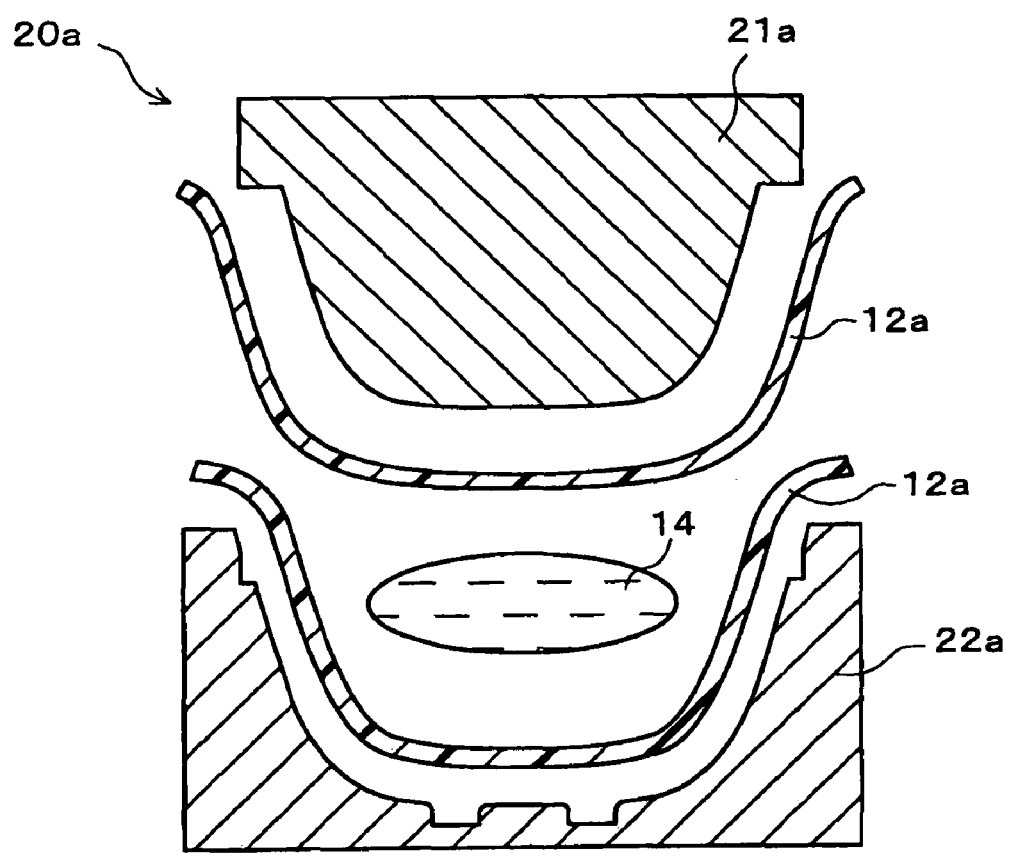
FIG. 14 is an explanatory view describing a case that a manufacturing method 2 is used, in the simultaneous attaching method for manufacturing the biodegradable molded article shown in FIG. 1 (a).

To describe the method 2 more specifically, as shown in FIG. 14, the metal mold 20*a* shown in FIGS. 5 (*a*) and 5 (*b*) is arranged so that two molding films 12*a* shaped substantially similar to the bowl-shaped container 10*a* are provided between the upper and lower parts 21*a* and 22*a*, and further the slurry/dough molding material 14 is provided between the molding films 12*a* and 12*a*. At this moment, the metal mold 20*a* is heated at less than the melting point of the biodegradable plastic that is the main ingredient of the forming film 12*a* (coating film 12). Then the upper and lower parts 21*a* and 22*a* are paired up and heated and pressurized to be molded, by the external heating or the internal heating. It is possible to acquire the bowl-shaped container 10*a* (see FIG. 1 (*a*)) as the biodegradable molded article of the present invention by this single step.

[Method 3]

Method 3 is identical with method 1, except that the coating film 12 is preformed like a bag, wherein the molding material is to be placed. This method is also particularly preferred for molding a horizontally long and wide biodegradable molded article such as the plate-shaped container 10*b* shown in FIG. 2 (*a*), in correspondence with the sheet-shaped coating film 12.

In the case of this method, as a bag film, the coating film 12 is formed into a bag to accommodate the molding material inside. If the molding material is placed inside this bag film, the molding material can be regarded as substantially wrapped by the bag film. So it becomes possible to store large amounts of the molding material prepared and pre-portioned in each bag film for a certain period of time. Furthermore, preparation of the molding is completed only by putting the wrapped material in the mold, at the time of manufacturing the biodegradable molded article. This makes it possible to further simplify the manufacturing process.

The method to form the coating film 12 into the bag film is not particularly limited to any method, so conventional methods to form sheet or film-shaped plastics into bag-shaped ones can be preferably used. Such example includes pillow type packaging. The storing method of wrapped material wherein the molding material is portioned in the bag film is not particularly limited to any method as well, if conventional storing methods to prevent starch from going rotten are used.

By the way, in the present invention, the bag film 12*b* storing the molding material inside is termed "composition for expansion molding". As described above, the compositions for expansion molding (abbreviated as molding composition) are capable of being prepared as large in numbers in advance and being stored for a certain period of time, and at the same time the biodegradable molded article on which the coating film is attached can be easily manufactured by simply putting the molding compositions in the molds. So the molding composition is suitable for manufacturing the biodegradable molded article in an easy and simple step.

Figure 15:
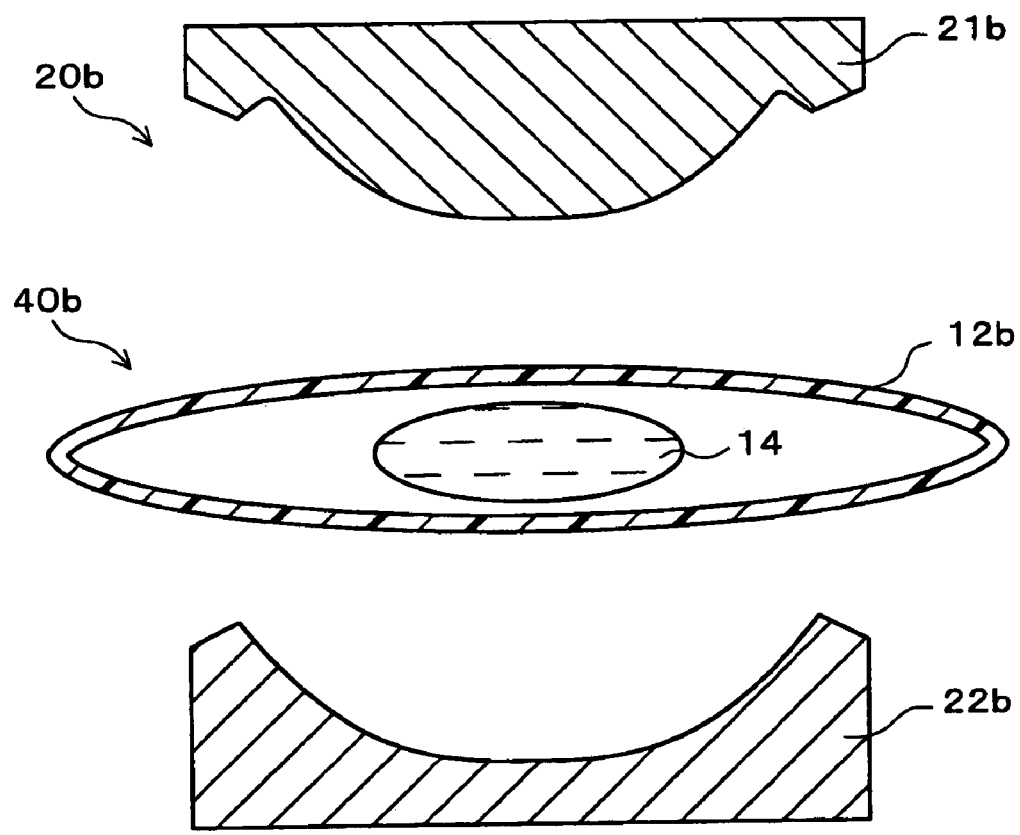
FIG. 15 is an explanatory view describing a case that a manufacturing method 3 is used, in the simultaneous attaching method for manufacturing the biodegradable molded article shown in FIG. 2 (a).

To describe the method 3 more specifically, as shown in FIG. 15, the coating film 12 is preformed into a bag shape to make the bag film 12*b*, and then molding compositions 40*b* is prepared in advance by portioning a certain amount of the molding material 14 in each of the bag films 12*b*. These molding compositions 40*b* are stored in a specified storage etc. Following the steps above, in the metal mold 20*b* shown in FIGS. 6 (*a*) and 6 (*b*), the molding compositions 40*b* taken out from the storage is placed on the lower part 22*b*, and the molding preparation is now done.

At this moment, the metal mold 20*b* is heated up to a temperature of less than melting point of the biodegradable plastic that is the main ingredient of the coating film 12 (bag film 12*b*). Then the upper and lower parts 21*b* and 22*b* are paired up and heated and pressurized to be molded, by the external heating or the internal heating. It is possible to acquire the plate-shaped container 10*b* (see FIG. 2 (*a*)) as the biodegradable molded article of the present invention by this single step.

[Method 4]

Method 4 is a method that integrates methods 1, 2, and 3, wherein the coating film 12 is preformed substantially similar to a bag shape as well as an outside shape of the biodegradable molded article. In other words, the bag film 12*d* of the method 3 is further modified to a molding bag film with substantially identical shape as that of the biodegradable molded article. This method is also preferably used for a biodegradable molded article with relatively deep draw depth, i.e. vertically tall shape, such as the bowl-shaped container 10*a* shown in FIG. 1 (*a*).

The molding bag film may be formed so that the coating film 12 is modified to be a bag-shaped film in advance and then formed to be substantially identical with the outside shape of the biodegradable molded article, or modified to the molding bag film after being substantially molded to the outside shape of the molded article. The forming method and the method to make the bag film are not particularly limited and conventional methods can suitably be used, as stated above.

Figure 16:
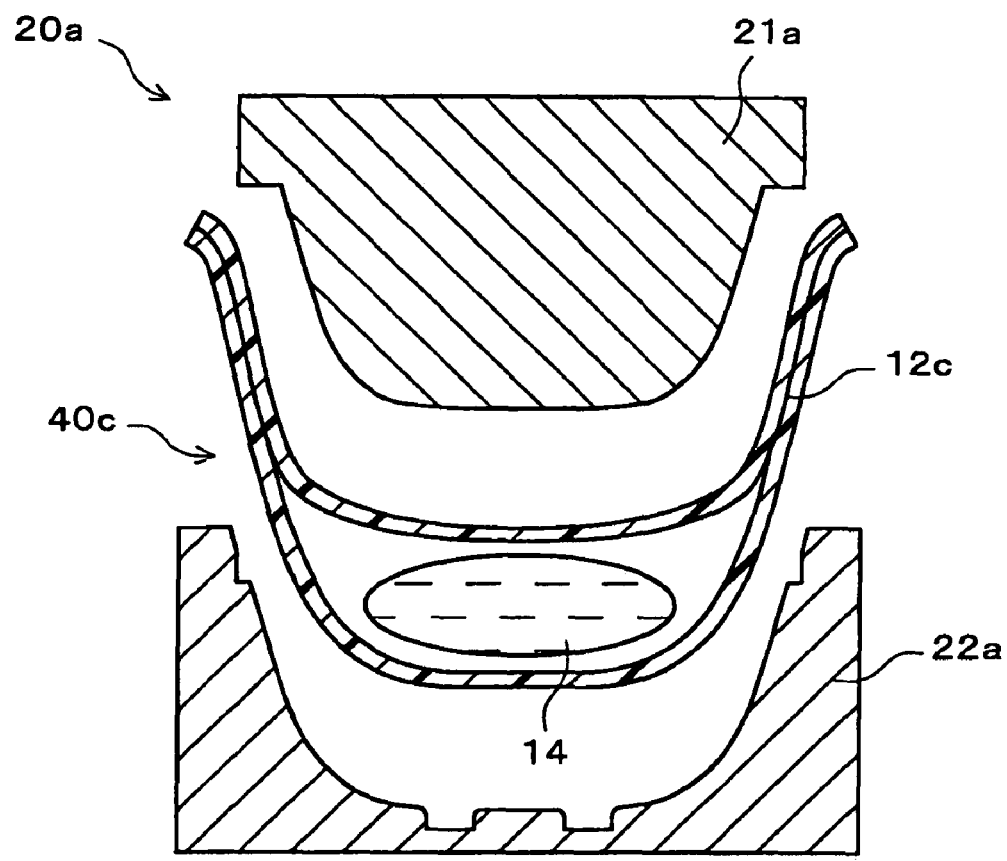
FIG. 16 is an explanatory view describing a case that a manufacturing method 4 is used, in the simultaneous attaching method for manufacturing the biodegradable molded article shown in FIG. 1 (a).

To describe method 4 more specifically, as shown in FIG. 16, the coating film 12 is preformed to the molding bag film 12*c*, and then the molding compositions 40*c* are prepared by portioning a certain amount of the molding material into each of the molding bag films 12*c*. It is possible to store these molding compositions 40*c* in a specified storage etc. Following the steps above, in the metal mold 20*a* shown in FIGS. 5 (*a*) and 5 (*b*), the molding compositions 40*c* taken out from the storage is placed on the lower part 22*a*, and the molding preparation is now done.

At this moment, the metal mold 20*a* is heated up to a temperature of less than the melting point of the biodegradable plastic that is the main ingredient of the coating film 12 (molding bag film 12*c*). Then the upper and lower parts 21*a* and 22*a* are paired up and heated and pressurized to be molded, by the external heating or the internal heating. It is possible to acquire the bowl-shaped container 10*a* (see FIG. 1 (*a*)) as the biodegradable molded article of the present invention by this single step.

[Method 5]

Method 5 is identical with method 1, except that the coating film 12 is used as a film part cut out to be preformed substantially identical to the outside shape of the biodegradable molded article. This method is preferably used for a biodegradable molded article with a deeper draw depth of more complicated shape, such as the cup-shaped container 10c shown in FIG. 3 (a).

Figure 17:
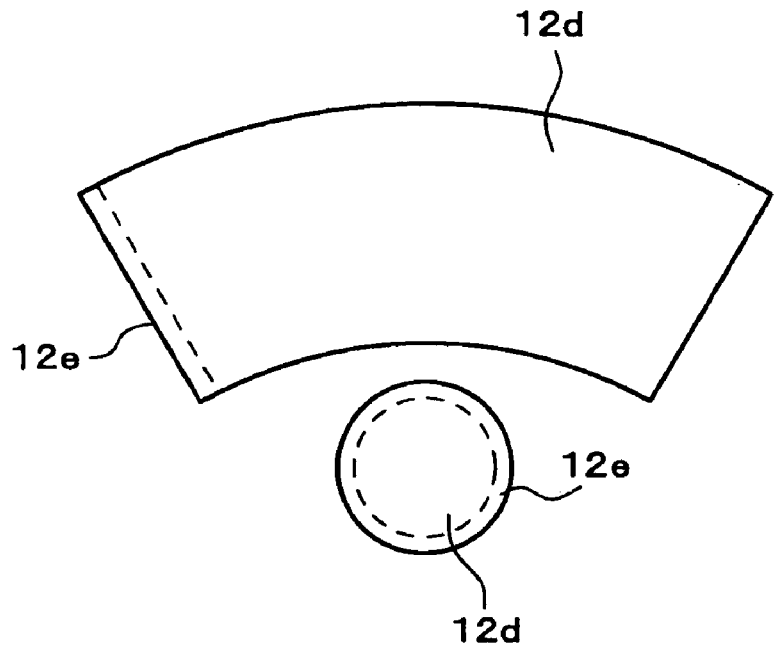
FIG. 17 (a) is a schematic plan view showing an example that the coating film is cut off in two pieces of film when the biodegradable molded article shown in FIG. 3 (a) is manufactured by using a manufacturing method 5, and FIG. 17 (b) is a schematic plan view showing an example that the coating film is cut off in three pieces of film.
Figure 17:
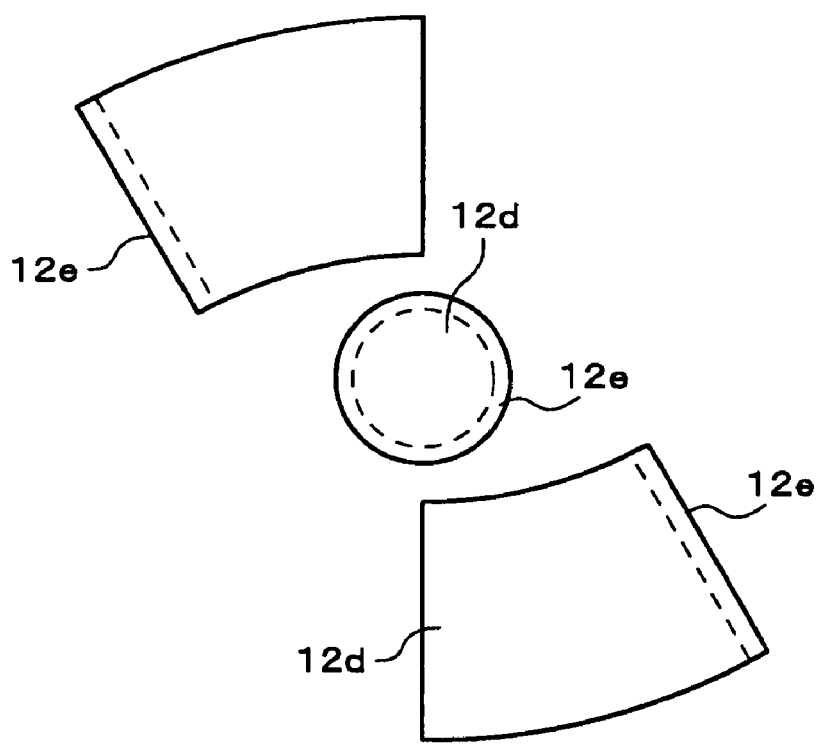

Although the concrete form of the film part is not particularly limited, usually, as FIGS. 17 (a) and 17 (b) show, it is preferable to make film parts 12d by cutting into individual face of rough development elevator of the biodegradable molded article after molding (for instance the cup-shaped container 10c).

The film part 12d further has an overlap section 12e equivalent to an overlap width, as FIGS. 17 (a) and 17 (b) show. This overlap section 12e is provided around a bottom film part 12d, and along an edge of a side film part 12d where the film part 12d is overlapped with itself to be adhered when the film part 12d is cylindrically wound, etc.

These overlap sections 12e are overlapped with each other at a designated section of each film part 12d, when the film part 12d is arranged in the cavity of the mold in the step of molding. On this account, the overlap section 12e and a part of the overlapping film part 12d are both softened and adhered (fused) to each other. Consequently, the film parts 12d is assembled as one substantially cup-shaped coating film 12, and after this coating film 12 is further adhered to the surface of the expanded molded article, the cup-shaped container 10c of the present invention is acquired.

The shape of the unfolded film part 12d is not particularly limited. So taking the cup-shaped container 10c as the example, the film part 12d may be cut out in two as the side and the bottom, i.e. the side and the bottom are each film part 12d as indicated in FIG. 17 (a), or in three as two sides and the bottom as indicated in FIG. 17 (b). In this matter, it is sufficient that an assembly of all film parts 12d overlapped at the overlap sections 12e takes a shape matched with the biodegradable molded article such as the cup-shaped one.

The coating film 12 before attaching is more similar to the shape after the molding in this method, than the methods 2 and 4. This method is adequately used when the coating film 12 mainly made of a biodegradable molded article with low drawability, especially when the biodegradable molded article with the deep draw depth such as the cup-shaped container 10c is molded using the coating film 12 with low drawability, and further when the thickness of the coating film 12 after attaching is desired to be freely adjusted, etc.

Figure 18:
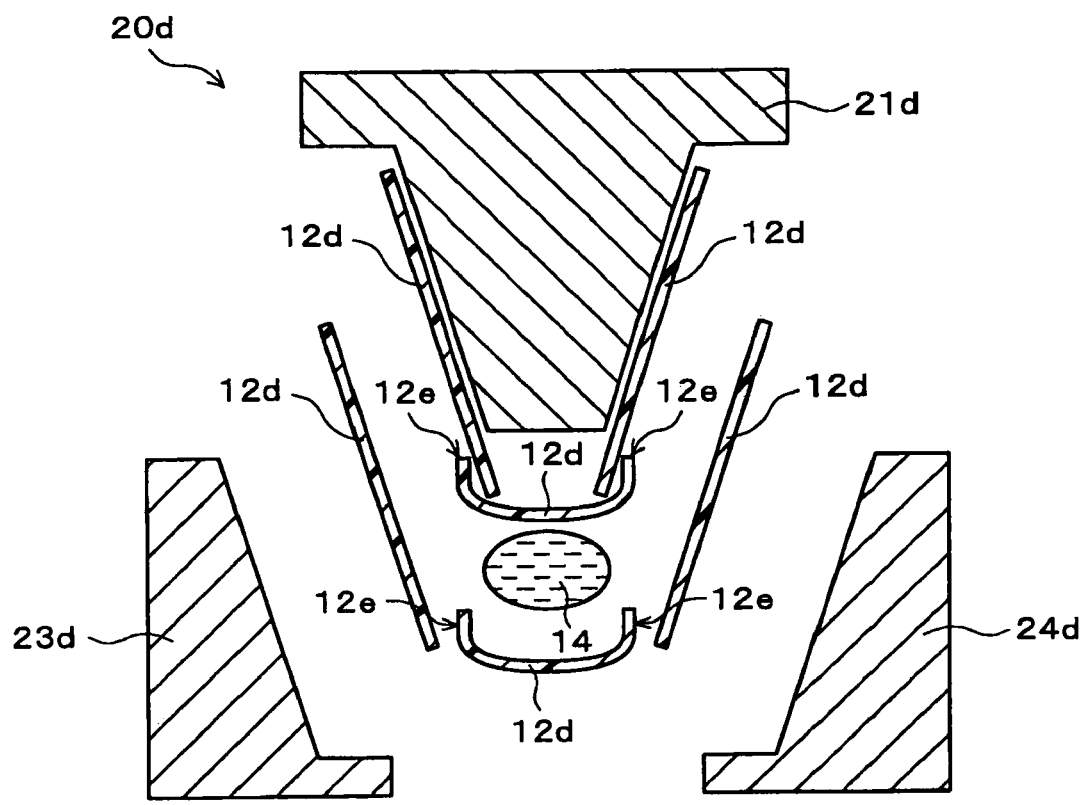
FIG. 18 is an explanatory view describing a case that a manufacturing method 5 is used, in the simultaneous attaching method for manufacturing the biodegradable molded article shown in FIG. 3 (a).

To describe the method 5 more specifically, in the metal mold 20d shown in FIGS. 8 (a) and 8 (b), the film part 12d matched with the bottom of the cup-shaped container 10c and the film part 12d matched with the side are arranged along the shapes of the cavity of the lower parts 23d and 24d, as shown in FIG. 18. At this time, the overlap sections 12e have to be surely overlapped with each other.

Then the molding material 14 is provided for the substantially cup-shaped film part 12d. At the same time, the film part 12d matched with the bottom of the cup-shaped container 10c and the film part 12d matched with the side thereof are arranged in accordance with the shape of the upper part 21, then the upper part 21d is paired with the lower parts 23d and 24d with the arranged film parts 12d. Of course the parts 21d, 23d, and 24d are heated up to a temperature of less than the melting point of the biodegradable molded article, of which the coating film 12 is mainly made.

After the steps above, heat and pressure molding is done by the external or internal heating. By this step of heat and pressure molding, the overlap sections 12e of the film parts 12d are fused as above and a layer of the coating film 12 is formed on the surface of the expanded molded article (main body 11c) without a gap between them. As a result, it is possible to acquire the cup-shaped container 10c (see FIG. 3 (a)) as the biodegradable molded article of the present invention, by the single step above.

[Method 6]

Method 6 is identical with method 5, except that the film parts 12c are adhered at the overlap sections 12e for the purpose to make the film parts 12c almost match with the outside shape of the biodegradable molded article before molding the same. As in the case of the method 5, this method is preferably used for a biodegradable molded article with a deeper draw depth or more complicated shape, such as the cup-shaped container 10c shown in FIG. 3 (a).

Being almost identical to the method 5, this method is arranged so that an outside shape film is preformed by securely adhering the overlap sections 12e and 12e by way of fusing etc. This method is preferable when the coating film 12, in which the overlap sections 12e and 12e are not easily fused, is used in the method 5.

Figure 19:
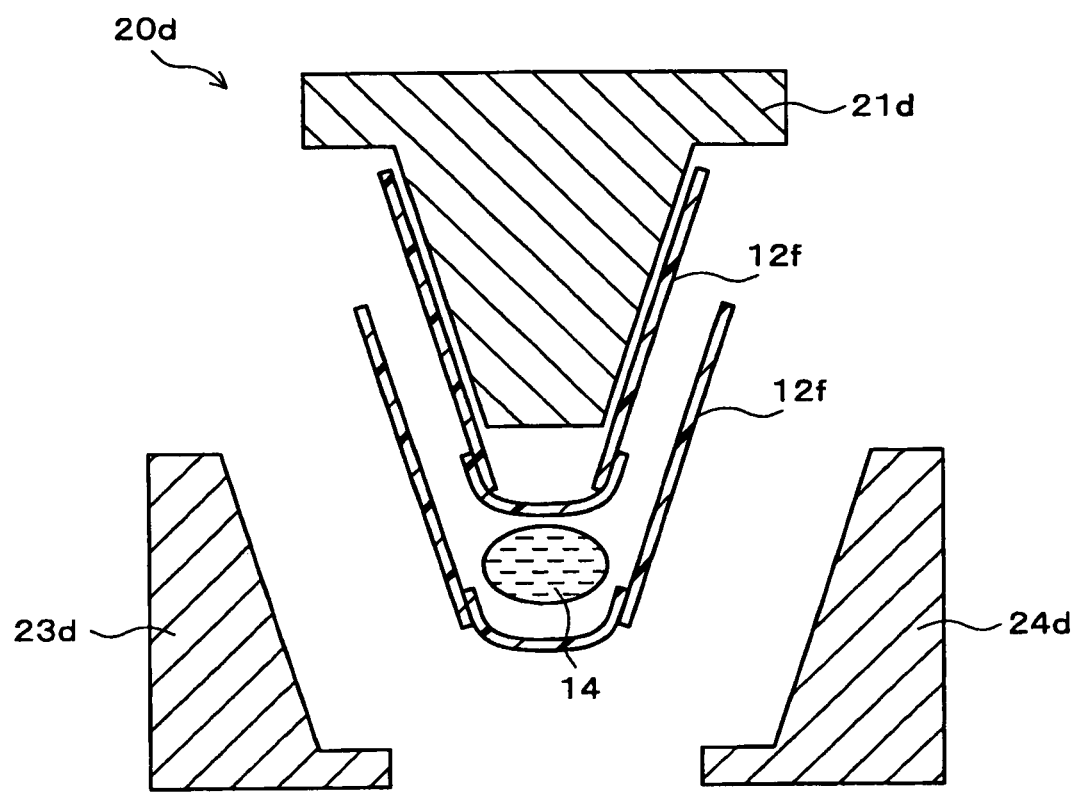
FIG. 19 is an explanatory view describing a case that a manufacturing method 6 is used, in the simultaneous attaching method for manufacturing the biodegradable molded article shown in FIG. 3 (a).

To describe the method 6 more specifically, as shown in FIG. 19, in the metal mold 20d indicated in FIGS. 8 (a) and 8 (b), two outside shape films 12f, which are adhered to be substantially similar to a cup-shape in advance, are overlaid and arranged between the upper and lower parts 21d, 23d, and 24d, and then the molding material is provided between the outside shape films 12f. At this moment, the metal mold 20b is heated up to a temperature of not more than the melting point of the biodegradable plastic that is the main ingredient of the outside shape film 12f (coating film 12). Then the upper and lower parts 21c, 23d, and 24d are paired up and the heat and pressure molding is conducted using the external or internal heating. As a result, it is possible to acquire the cup-shaped container 10c (see FIG. 3 (a)) as the biodegradable molded article of the present invention, by the single step above.

[Method 7]

In method 7, the method 6 is further combined with method 3. That is to say, after the film parts 12c are adhered at the overlap sections 12e and formed to be almost identical with the outside shape of the biodegradable molded article before the molding process, the shaped film parts 12c are overlaid to be a substantially bag shape and the molding material is portioned into the same. As in the cases of the methods 5 and 6, this method is preferably used for a biodegradable molded article with a deeper draw depth or more complicated shape, such as the cup-shaped container 10c shown in FIG. 3 (a).

As in the cases of the methods 3 and 4, the molding compositions are prepared by converting the coating film 12 to the bag film and putting the molding material therein. Thus the molding composition can be stored for a certain period of time and also the preparation of molding can be completed only by putting the molding compositions into the mold at a time, so it becomes possible to further simplify the manufacturing process.

Figure 20:
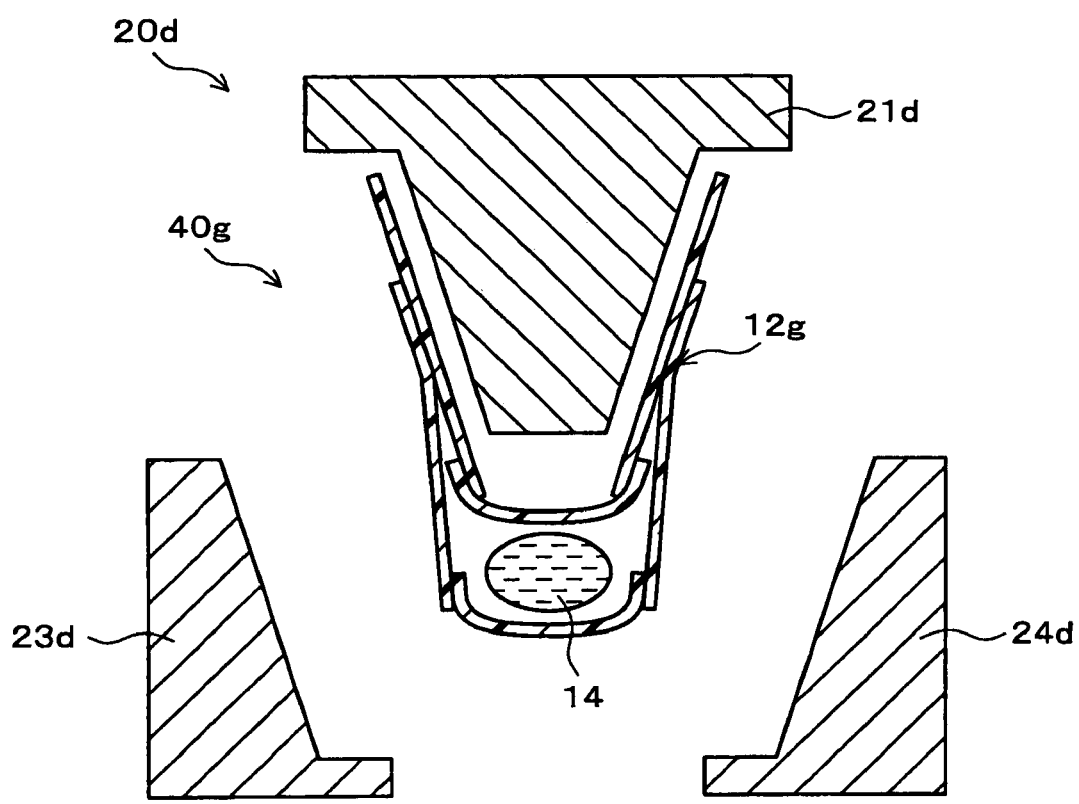
FIG. 20 is an explanatory view describing a case that a manufacturing method 7 is used, in the simultaneous attaching method for manufacturing the biodegradable molded article shown in FIG. 3 (a).

To describe method 7 more specifically, as shown in FIG. 20, after the coating film 12 is connected to be the film parts matched with the outside shape of the cup-shaped container 10c, the film parts are adhered to make the outside shape film, and two of the same are adhered to make a bag-shaped outline bag film 12g before the procedures below. Then a certain amount of the molding material 14 is portioned into each of the outline bag films 12g and the molding compositions 40g are stored in a designated storage etc. Following the steps above, in the metal mold 20d shown in FIGS. 8 (a) and 8 (b), preparation for molding is completed easily by simply taking out the molding composition 40g substantially formed into a cup shape from the storage and placing the same on the lower parts 23d and 24d.

At this moment, the metal mold 20d is heated up to a temperature of less than the melting point of the biodegradable plastic that is the main ingredient of the coating film 12 (outline bag film 12g). Then the upper and lower parts 21d, 23d, and 24d are paired up and the heat and pressure molding is conducted using the external or internal heating. As a result, it is possible to acquire the cup-shaped container 10c (see FIG. 3 (a)) as the biodegradable molded article of the present invention, by the single step above.

In all attaching methods described above, i.e. both after attaching method and simultaneous attaching method, the coating film 12 is not necessarily attached to the whole expanded molded article, so it is sufficient that the coating film 12 is attached only on a part of the expanded molded article desired to be coated for instance, a plate used only for placing food on the face such as:

- a one-way plate on which light meals such as takoyaki, Fried noodles, Japanese-style pancake, hot dogs, and fried potato are temporarily placed when eaten and thrown away after the consumption; and
- a plate used as a base for wrapping a cake etc. does not have to be coated except that the top face of the plate. So it is sufficient that the coating film 12 is only attached on the top face.

For instance, in the simultaneous attaching methods 1 to 7, the molding material is sandwiched by two coating films 12 and the whole surface of the expanded molded article is coated by the coating film 12 at the time of the steam expansion molding using the mold. However, it is possible to coat only the top face of the expanded molded article by the coating film 12 in the simultaneous attaching methods 1 to 7.

Moreover, when the biodegradable molded article in accordance with the present invention is used as a cushioning material for wrapping electrical appliances etc., it is sufficient that the coating film is attached only on areas directly touching the appliances. Especially, the cushioning as well as the attaching mold to attach the coating film become large when the appliances to be wrapped is large in size, so it is sufficient to attach the coating film on a requisite minimum space when the biodegradable molded article becomes large.

In the meantime, if the whole parts of the container requires gas impermeability in the case such as a container of noodles (such as the bowl-shaped container 10a shown in FIGS. 1 (a) and 1 (b)) in which not only boiling water is poured but also dried noodles that have to avoid oxidation or moisture absorption are placed in the container, it is preferable if the coating film 12 coats every part of the container.

Next, what is described is an example of a simultaneous attaching method in which only a part of the surface of the expanded molded article is coated by the coating film 12.

[Method 1A]

Method 1A is a modification of the method 1, and a method that only one coating film 12 is provided on the top side of the molding material, instead of two coating films 12 sandwiching the molding material in the case of the method 1, thus the coating film 12 is attached only on the top face of the expanded molded article.

Figure 22:
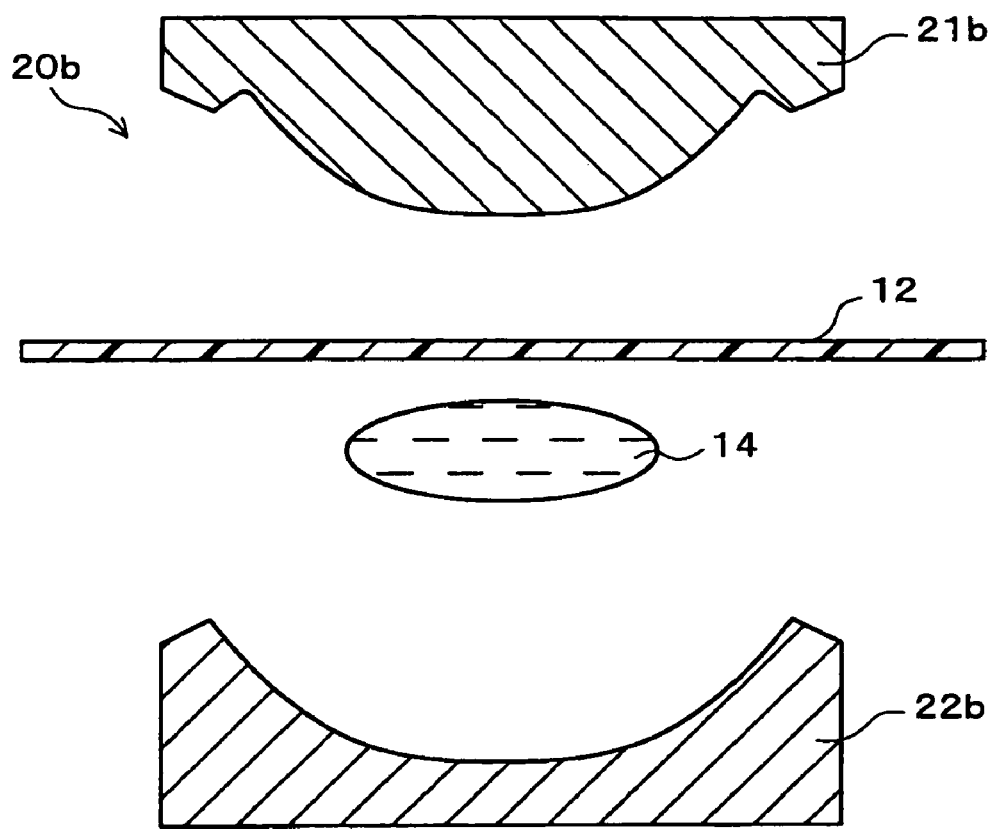
FIG. 22 is an explanatory view describing a case that a manufacturing method 1B is used in the simultaneous attaching method.

To describe the method 1A more specifically, as FIG. 22 shows, only one coating film 12, which is still shaped like a sheet, is provided between the upper and lower parts 21b and 22b of the metal mold 20b shown in FIGS. 6 (a) and 6 (b), and subsequently the slurry/dough molding material 14 is provided between the coating film 12 and the lower part 22b. At this moment, the metal mold 20b is heated up to a temperature of less than the melting point of the biodegradable plastic that is the main ingredient of the coating film 12. Then the upper and lower parts 21b and 22b are paired up and heated and pressurized to be molded, by the external heating or the internal heating. It is possible to acquire a plate-shaped container 10d (see FIG. 23) as the biodegradable molded article of the present invention by the single step above.

Figure 23:
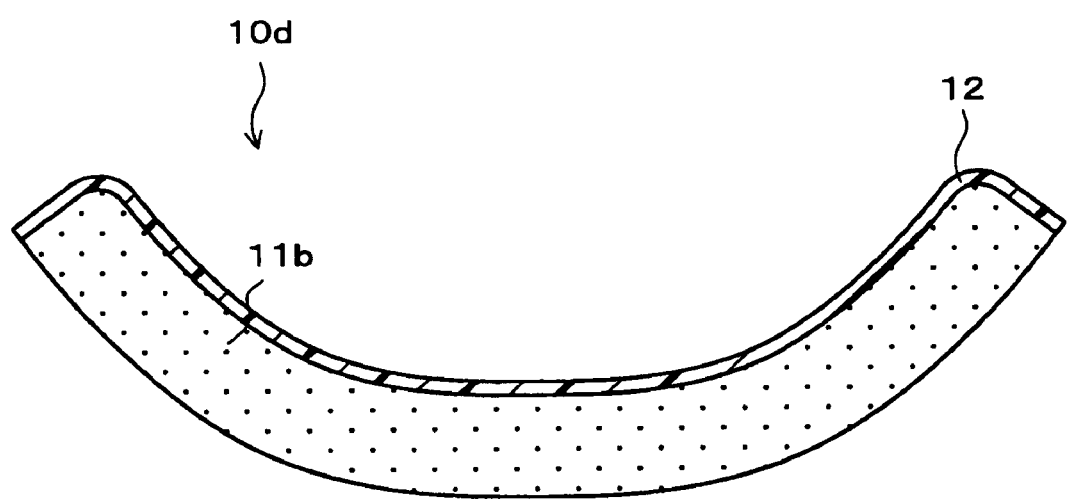
FIG. 23 is a schematic cross-sectional view showing a shape of a plate-shaped container acquired by the manufacturing method 1B as still another example of the biodegradable molded article of an embodiment in accordance with the present invention.

As FIG. 23 shows, in the plate-shaped container 10d only top side of the main body 11b to place food is coated by the coating film 12. The top side of the plate-shaped container 10d has good water resistance. Thus the container 10d is preferably used for the plates described above, such as the one-way plate thrown away after food is placed thereon and the plate used as a base for wrapping a cake etc.

In the present invention, in addition to the mold for molding the expanded molded article, the attaching mold having a cavity that is substantially identical to that of the mold is required, when the after attaching method is adopted for attaching the coating film 12. Meanwhile, when the simultaneous-attaching method is adopted, the attaching mold is unnecessary and the coating film 12 can be attached simultaneously with molding the expanded molded article.

Therefore, it is possible to make the coating film 12 substantially adhere to the surface of the expanded molded article with precision and certainty. Especially, even when a complicatedly shaped molded article is manufactured by using the after attaching method, simply copying the shape of the mold allows to manufacture the molded article without creating the attaching mold 30 matched with the expanded molded article or adjusting the shape delicately, because the shape of the molded article depends on a shape of the cavity of the mold.

Moreover, the present invention is arranged so that the coating film 12 is attached either after the expanded molded article is preformed to a designated shape from starch (natural material) as main ingredient through the steam expansion or simultaneously with the steam expansion of the expanded molded article above. Thus molded articles having any kind of shapes can be molded as long as capable of being released from the mold. For instance, it is possible to steadily mold the molded articles such as those which have a deep draw depth like a cup, those which have uneven thickness like a food tray with partitions and a wrapping tray, a really complicatedly shaped cushioning material, etc.

Furthermore, when the coating film 12 is attached using the after attaching method, as described above, it is possible to acquire variously shaped molded articles with biodegradability and good water/moisture resistance, since the attaching mold that has the shape substantially identical to that of the mold for molding, is used.

Also, if the coating film 12 which is not only water resistant but also gas impermeable etc. is used, when the molded article is used for a container etc., it becomes possible to prevent the contents thereof from being oxidized or getting moist etc. and a molded container suitable for preserving can be acquired, since it becomes possible to add various characteristics such as gas impermeability to the biodegradable molded article of the present invention.

In addition, when words and pictures are printed on the surface of the coating film 12 in advance by using biodegradable ink, simply attaching the coating film 12 allows to print beautiful and detailed design on the surface of the expanded molded article much easily, compared to printing directly on the surface thereof.

In other words, in the present invention, it is possible to add various characteristics to the biodegradable molded article of the present invention easily and certainly, if the coating film 12 is attached on the expanded molded article after functions are imparted to the coating film 12 in advance.

When the biodegradable molded article of the present invention is used as a sealable container for holding things inside thereof, the container is often shaped as having an opening. So to seal the container, there is a method to seal the opening by an adhesive lid, for instance. In this case, as FIG. 21 (a) shows, it is preferable that at least the coating film 12 is attached on an edge 16 of the opening.

Figure 21:
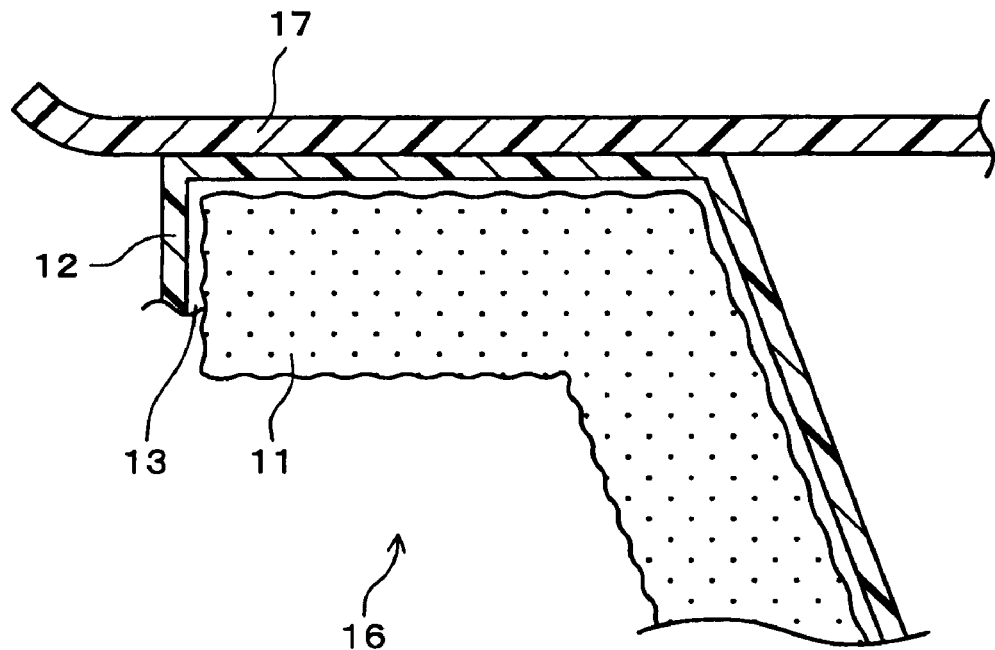
FIG. 21 (a) is a schematic explanatory view showing a state that an adhesive lid is adhered to an edge of the biodegradable molded article shown in FIG. 1 (b), and FIG. 21 (b) is a schematic explanatory view showing a state that the coating film is not adhered on the edge shown in FIG. 21 (a).
Figure 21:
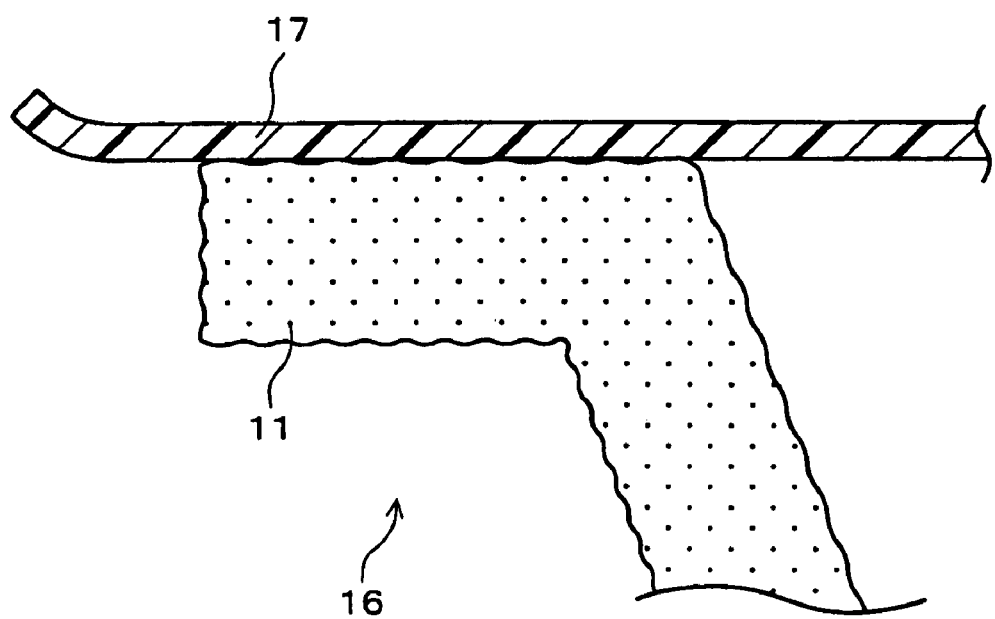

The expanded molded article is mainly made of natural starch on which steam expansion is conducted. Thus microscopic bumps and dips are formed on the surface of the expanded molded article 11 as a result, as schematically shown in FIGS. 21 (a) and 21 (b). These bumps and dips are predominantly caused by the steam expansion molding, and as FIG. 21 (b) shows, they make the contact between the adhesive lid 17 and the edge 16 worse and the sealability becomes insufficient.

There is a conventional technology to apply water resistant resin on the surface. However, because of the microscopic bumps and dips, no matter how the resin is applied evenly, gaps and pinholes are likely to be created on a coating of the applied resin to be matched with the bumps and dips, and it is impossible to form a smooth coating. Thus adequate water/moisture resistance cannot be acquired. Furthermore, gas impermeability is required when oxidation etc. of the contents needs to be prevented. However, the microscopic bumps and gaps lower the gas impermeability too.

To take measures against this, in the present invention, the coating film 12 which is naturally formed as a complete film is attached, for instance, via the adhesive layer 13 or by being softened concurrently with the expansion molding and then directly adhered. Thus, as FIG. 21 (a) shows, in the edge 16, adhesion between the adhesive lid 17 and the edge 16 on which the coating film 12 is attached is improved. On this account, the sealability of the opening, such as water resistance, moisture resistance, gas impermeability, etc., is improved, and the contents are better preserved.

As described above, when the coating film 12 is partly attached, after the attaching mold (mold 30 shown in FIG. 11, for instance) for attaching is prepared, an appropriately sized coating film 12 and the adhesive film 13a are arranged to be sandwiched by the attaching mold and the expanded molded article, and then the coating film 12 is pressed and attached to the expanded molded article.

In this manner, the biodegradable molded article in accordance with the present invention is arranged so that the coating film made of biodegradable plastics is attached on the surface of the expanded molded article mainly made of starch. As a result, high water resistance can be added to the surface of the expanded molded article, while keeping stability of the shape (property of keeping an appropriate thickness) and heat insulation. In addition, it becomes possible to improve strength and flexibility of the expanded molded article.

Moreover, both the expanded molded article and the film have biodegradability and are adequately biodegraded, and especially an expanded molded article with a large thickness has very good biodegradability since the same is mainly made of starch. In the meantime, the film is thin enough despite the same is made of biodegradable plastic which is biodegraded slowly. On this account, the biodegradable molded article in accordance with the present invention is biodegraded well when disposed.

Furthermore, since the complete coating film is attached on the surface of the expanded molded article, when the expanded molded article is used as a container with an opening, it becomes possible to completely seal the adhesive lid on the edge of the opening by heating.

The biodegradable molded article in accordance with the present invention is preferably used as a molded article for wrapping such as cushioning material, GES, and a wrapping tray, a container of ready-to-eat food such as noodles (Chinese noodles, Japanese wheat noodles, buckwheat noodles, fried Chinese noodles and etc.), one-way plate or tray used in the catering industry, and a container of food such as soup and juice.

Especially the water resistance enables the biodegradable molded article of the present invention to be preferably used for a container of food having a high water content, and the same is also preferably used as a container of ready-to-eat food such as noodles to be stored for a certain period of time, because of the gas impermeability thereof.

Now, the present invention is described further in detail, on the basis of examples and comparative examples. However, the present invention is not limited to these examples.

[Moisture Absorption Strength (Moisture Resistance Strength)]

For moisture absorption strength (moisture resistance strength) of the biodegradable molded article in examples and comparative examples, the assessment was made by the following method.

After the resultant biodegradable molded article was left for 30 days under high humidity kept at a temperature of 40° C. and at a 90% relative humidity, the assessment was made in terms of softening or deformation of the biodegradable molded article due to moisture absorption. The double circle indicates that there is no change (deformation or softening) and no reduction of strength due to moisture absorption. The single circle indicates that there is no deformation (change of outside shape) but slight softening due to moisture absorption. The triangle indicates that there is softening and deformation due to moisture absorption but the shape and strength is maintained at practical level. The cross mark indicates that there is softening and deformation at a non-usable level.

Example 1

First of all, 30.0 grams of starch as the main ingredient, 7.0 grams of coniferous virgin pulp as water-insoluble fiber (strength adjusting agent), 7.0 grams of calcium carbonate as strength adjusting agent, 0.2 gram of guar gum as stabilizer and strength adjusting agent, 55.8 grams of water were mixed to prepare 100 grams of dough molding material. In this example, only high-amylose starch (corn starch containing 60% of amylose) was used as starch.

Next, in the aforementioned method 1 of the simultaneous attaching method the above molding material as the molding material 14, the biaxially stretched modified polyester film (50 μm thick) as the coating film 12, and the metal mold 20a shown in FIGS. 5 (a) and 5 (b), were used to manufacture the bowl-shaped container 10a. As for the heating method, both external heating to heat the metal mold 20a by an electric heater and internal heating by high-frequency dielectric heating were used. Also, in the external heating and internal heating, a temperature of the metal mold 20a was adjusted to 130 to 150° C.

Water absorption strength of the resultant bowl-shaped container 10a was assessed by the aforementioned method. The result is shown in table 1.

Example 2

The bowl-shaped container 10a was manufactured in the same way as example 1 except that a mixture of 25 weight % of potato starch and 75 weight % of high-amylose starch (corn starch containing 60% of amylose) is used as starch instead of high-amylose starch.

Moisture absorption strength of the resultant bowl-shaped container 10a was assessed in the aforementioned method. The result is shown in table 1.

Example 3

The bowl-shaped container 10a was manufactured in the same way as example 1 except that a mixture of 40 weight % of potato starch and 60 weight % of high-amylose starch (corn starch containing 60% of amylose) is used as starch instead of high-amylose starch.

Moisture absorption strength of the resultant bowl-shaped container 10a was assessed in the aforementioned method. The result is shown in table 1.

Example 4

The bowl-shaped container 10a was manufactured in the same way as example 1 except that a mixture of 50 weight % of potato starch and 50 weight % of high-amylose starch (corn starch containing 60% of amylose) is used as starch instead of high-amylose starch.

Moisture absorption strength of the resultant bowl-shaped container 10a was assessed in the aforementioned method. The result is shown in table 1.

COMPARATIVE EXAMPLE 1

The bowl-shaped container 10a was manufactured in the same way as example 1 except that only potato starch is used as starch instead of high-amylose starch.

Moisture absorption strength of the resultant bowl-shaped container 10a was assessed in the aforementioned method. The result is shown in table 1.

TABLE 1

|  | Example 1 | Example 2 | Example 3 | Example 4 | Comparative example 1 |
| --- | --- | --- | --- | --- | --- |
| Potato starch | 0% | 25% | 40% | 50% | 100% |
| High-amylose starch | 100% | 75% | 60% | 50% | 0% |
| Moisture absorption strength | ⊚ | ⊚ | ○ | Δ | X |

% shows weight % in the above table.

Comparing the result of the comparative example 1 in table 1 with the results of the examples 1 to 4, it is found that moisture absorption is improved in case of using starch containing high-amylose starch, as compared with the case of using starch containing potato starch only. Moreover from the results of examples 1 to 4, to improve moisture absorption strength, among starch containing high-amylose starch, starch containing not less than 50 weight % of starch high-amylose starch is preferable, more preferably starch containing not less than 60 weight % of starch high-amylose starch, and still more preferably starch containing not less than 75 weight % of starch high-amylose starch.

Example 5

First of all, 30.0 grams of potato starch and 15.0 grams of polyvinyl alcohol having less than 1000 polymerization degree and less than 70% saponification degree as the main ingredient, 4.0 grams of coniferous virgin pulp as water-insoluble fiber (strength adjusting agent), 10.0 grams of calcium carbonate as strength adjusting agent, 0.2 gram of guar gum as stabilizer and strength adjusting agent, and water were mixed to prepare dough molding material. Water was adjusted to make solid content 54.2 weight % (percentage of solids to total weight of molding material). In this case, water was 58.5 grams and total weight of molding materials was 127.7 grams. Also, weight of solids (components except water in the molding material) was 69.2 grams.

Next, in the aforementioned method 1 of the simultaneous attaching method, the above molding material as the molding material 14, the biaxially stretched modified polyester film (35 μm thick) as the coating film 12, and the metal mold 20a shown in FIG. 5 (a) and FIG. 5 (b), were used to manufacture the bowl-shaped container 10a.

As for the heating method, both external heating to heat the metal mold 20a by an electric heater and internal heating by high-frequency dielectric heating were used. Also, in the external heating and internal heating, a temperature of the metal mold 20a was adjusted to 130 to 150° C.

Water absorption strength of the resultant bowl-shaped container 10a was assessed by the aforementioned method. The result is shown in table 2.

Example 6

The bowl-shaped container 10a was manufactured in the same way as example 6 except that the volume of polyvinyl alcohol was changed to 12.0 grams and the volume of water was changed to adjust solid content to 54.2 weight %. In this case, water was 55.9 grams and total weight of the molding material was 122.1 grams. Also, weight of solids (components except for water in the molding material) was 66.2 grams.

Moisture absorption strength of the resultant bowl-shaped container 10a was assessed in the aforementioned method. The result is shown in table 2.

Example 7

The bowl-shaped container 10a was manufactured in the same way as example 6 except that the volume of polyvinyl alcohol was changed to 8.0 grams and the volume of water was changed to adjust solid content to 54.2 weight %. In this case, water was 52.6 grams and total weight of the molding material was 114.8 grams. Also, weight of solids (components except for water in the molding material) was 62.2 grams.

Moisture absorption strength of the resultant bowl-shaped container 10a was assessed in the aforementioned method. The result is shown in table 2.

COMPARATIVE EXAMPLE 2

The bowl-shaped container 10a was manufactured in the same way as example 6 except that the volume of polyvinyl alcohol was not used and the volume of water was changed to adjust solid content to 54.2 weight %. In this case, water was 45.8 grams and total weight of the molding material was 100.0 grams. Also, weight of solids (components except for water in the molding material) was 54.2 grams.

Moisture absorption strength of the resultant bowl-shaped container 10a was assessed in the aforementioned method. The result is shown in table 2.

TABLE 2

|  | Example 5 | Example 6 | Example 7 | Comparative example 2 |
|---|---|---|---|---|
| Potato starch (g) | 40.0 | 40.0 | 40.0 | 40.0 |
| Polyvinyl alcohol (g) | 15.0 | 12.0 | 8.0 | 0 |
| Pulp (g) | 4.0 | 4.0 | 4.0 | 4.0 |
| Calcium carbonate (g) | 10.0 | 10.0 | 10.0 | 10.0 |
| Guar gum (g) | 0.2 | 0.2 | 0.2 | 0.2 |
| Water (g) | 58.5 | 55.9 | 52.6 | 45.8 |
| Total weight (g) | 127.7 | 122.1 | 114.8 | 100.0 |
| Solids (g) | 69.2 | 66.2 | 62.2 | 54.2 |
| Percentage of solids (weight %) | 54.2 | 54.2 | 54.2 | 54.2 |
| Content of polyvinyl alcohol (weight %) | 11.7 | 9.8 | 7.0 | 0 |
| Moisture absorption strength | ◎ | ○ | Δ | X |

Comparing the result of the comparative example 2 in table 2 with the results of the examples 5 to 7, it is found that moisture absorption is improved in case of using polyvinyl alcohol, as compared with the case that polyvinyl alcohol is not used.

Example 8

First of all, 37.0 grams of starch and 7.0 grams of polyvinyl alcohol (PVA) having less than 1000 polymerization degree and less than 70% saponification degree as the main ingredient, 7.0 grams of coniferous virgin pulp as water-insoluble fiber (strength adjusting agent), and 49.0 grams of water were mixed to prepare dough molding material. In this case, total weight of the molding material was 100.0 grams. Also, content of polyvinyl alcohol in the molding material is 7.0 weight %. Also, in this case, weight of solids (components except for water in the molding material) is 51.0 grams and percentage of solids in the molding material is 51.0 weight %.

Next, in the aforementioned method 1 of the simultaneous attaching method, the above molding material as the molding material 14, the biaxially stretched modified polyester film (50 μm thick) as the coating film 12, and the metal mold 20a shown in FIG. 5 (*a*) and FIG. 5 (*b*), were used to manufacture the bowl-shaped container 10a.

As for the heating method, both external heating to heat the metal mold 20a by an electric heater and internal heating by high-frequency dielectric heating were used. Also, in the external heating and internal heating, a temperature of the metal mold 20a was adjusted to 140 to 160° C.

Water absorption strength of the resultant bowl-shaped container 10a was assessed by the aforementioned method. The result is shown in table 3.

Example 9

The bowl-shaped container 10a was manufactured in the same way as example 8 except that polyvinyl alcohol having polymerization degree between 1000 and less than 1500 and less than 70% saponification degree was used instead of polyvinyl alcohol used in example 8.

Moisture absorption strength of the resultant bowl-shaped container 10a was assessed in the aforementioned method. The result is shown in table 3.

Example 10

The bowl-shaped container 10a was manufactured in the same way as example 8 except that polyvinyl alcohol having not less than 1500 polymerization degree and less than 70% saponification degree was used instead of polyvinyl alcohol used in example 8.

Moisture absorption strength of the resultant bowl-shaped container 10a was assessed in the aforementioned method. The result is shown in table 3.

Example 11

The bowl-shaped container 10a was manufactured in the same way as example 8 except that polyvinyl alcohol having less than 1000 polymerization degree and saponification degree between 70% and less than 90% was used instead of polyvinyl alcohol used in example 8.

Moisture absorption strength of the resultant bowl-shaped container 10a was assessed in the aforementioned method. The result is shown in table 3.

Example 12

The bowl-shaped container 10a was manufactured in the same way as example 8 except that polyvinyl alcohol having polymerization degree between 1000 and less than 1500 and saponification degree between 70% and less than 90% was used instead of polyvinyl alcohol used in example 8.

Moisture absorption strength of the resultant bowl-shaped container 10a was assessed in the aforementioned method. The result is shown in table 3.

Example 13

The bowl-shaped container 10a was manufactured in the same way as example 8 except that polyvinyl alcohol having not less than 1500 polymerization degree and saponification degree between 70% and less than 90% was used instead of polyvinyl alcohol used in example 8.

Moisture absorption strength of the resultant bowl-shaped container 10a was assessed in the aforementioned method. The result is shown in table 3.

Example 14

The bowl-shaped container 10a was manufactured in the same way as example 8 except that polyvinyl alcohol having less than 1000 polymerization degree and not less than 90% saponification degree was used instead of polyvinyl alcohol used in example 8.

Moisture absorption strength of the resultant bowl-shaped container 10a was assessed in the aforementioned method. The result is shown in table 3.

Example 15

The bowl-shaped container 10a was manufactured in the same way as example 8 except that polyvinyl alcohol having polymerization degree between 1000 and less than 1500 and not less than 90% saponification degree was used instead of polyvinyl alcohol used in example 8.

Moisture absorption strength of the resultant bowl-shaped container 10a was assessed in the aforementioned method. The result is shown in table 3.

Example 16

The bowl-shaped container 10a was manufactured in the same way as example 8 except that polyvinyl alcohol having not less than 1500 and not less than 90% of saponification degree.

Moisture absorption strength of the resultant bowl-shaped container 10a was assessed in the aforementioned method. The result is shown in table 3.

TABLE 3

|  | Polymerization degree of PVA | Saponification degree of PVA | Moisture absorption strength |
|---|---|---|---|
| Example 8 | Less than 1000 | Less than 70% | Δ~X |
| Example 9 | Between 1000 and less than 1500 | Less than 70% | Δ |
| Example 10 | Not less than 1500 | Less than 70% | ○ |
| Example 11 | Less than 1000 | Between 70% and less than 90% | Δ |
| Example 12 | Between 1000 and less than 1500 | Between 70% and less than 90% | ○ |
| Example 13 | Not less than 1500 | Between 70% and less than 90% | ◉ |
| Example 14 | Less than 1000 | Not less than 90% | ○ |
| Example 15 | Between 1000 and less than 1500 | Not less than 90% | ◉ |
| Example 16 | Not less than 1500 | Not less than 90% | ◉ |

From the comparison of the results in the examples 8 to 16 in table 3, it is found that the higher polymerization degree of polyvinyl alcohol used and the higher saponification degree is, the further moisture absorption strength is improved. Moreover, it is found that saponification degree especially effects improvement of moisture absorption strength. From the above, to improve moisture absorption strength, polymerization degree of polyvinyl alcohol in the molding material is preferably not less than 1000, more preferably not less than 1500. Also, to improve moisture absorption, saponification degree of polyvinyl alcohol in the molding material is preferably not less than 70%, and more preferably not less than 90%.

In the meantime, as for the bowl-shaped container 10a acquired in the examples 1 to 16 and comparative examples 1 and 2, to assess the piercing strength, maximum stress and entering distance were measured when a bar-shaped plunger of 2 mm in diameter and 1 R of a curved surface rate at the end is pierced in the container at a rate of 6 cm/min. using a Rheometer produced by Rheotech under a condition before moisture absorption strength is measured. In the result, there is no meaningful difference among all the samples for both maximum stress and entering distance. Accordingly, there is no relation between piercing strength and moisture absorption strength.

It is proven that an excellent nature of the biodegradable container in the present invention is quite different nature from "strength" generally referred to for a conventional biodegradable container made from starch, that is, strength when handled under dry condition or a normal atmosphere such as the above piercing strength.

Example 17

The bowl-shaped container 10a was manufactured in the same way as example 16 except that the volume of polyvinyl alcohol was changed to 4.8 grams and the volume of water was changed to adjust solid content to 54.2 weight %. In this case, the content of polyvinyl alcohol in the molding material is 5.0 weight %.

Moisture absorption strength of the resultant bowl-shaped container 10a was assessed in the aforementioned method. The result is shown together with the result of example 16 in table 4.

Example 18

The bowl-shaped container 10a was manufactured in the same way as example 16 except that the volume of polyvinyl alcohol was changed to 3.7 grams and the volume of water was changed to adjust solid content to 54.2 weight %. In this case, the content of polyvinyl alcohol in the molding material is 4.0 weight %.

Moisture absorption strength of the resultant bowl-shaped container 10a was assessed in the aforementioned method. The result is shown in table 4.

Example 19

The bowl-shaped container 10a was manufactured in the same way as example 16 except that the volume of polyvinyl alcohol was changed to 2.75 grams and the volume of water was changed to adjust solid content to 54.2 weight %. In this case, the content of polyvinyl alcohol in the molding material is 3.0 weight %.

Moisture absorption of the resultant bowl-shaped container 10a was assessed in the aforementioned method. The result is shown in table 4.

TABLE 4

|  | Content of PVA in the molding material | Moisture absorption strength |
|---|---|---|
| Example 16 | 7.0 weight % | ◉ |
| Example 17 | 5.0 weight % | ◉ |
| Example 18 | 4.0 weight % | ○ |
| Example 19 | 3.5 weight % | Δ |

From the results of examples 8 to 17, it is proven that sufficient moisture absorption strength is improved by controlling polymerization degree and saponification degree of polyvinyl alcohol even if a content of polyvinyl alcohol is limited to 5 to 7 weight %.

Also, from the results of examples 16 to 19, it is proven that moisture absorption strength is improved if the content of polyvinyl alcohol in the molding material is not less than 4.0 weight %, and moisture absorption strength is further improved if the content of polyvinyl alcohol is not less than 5.0 weight %.

The embodiments or examples shown in "BEST MODE FOR CARRYING OUT THE INVENTION" are intended to disclose technical information on the present invention, and it should not be interpreted that the present invention is limited to these examples or embodiments in narrow sense. The present invention can be executed by making various changes within the range of the claims described below under the sprit of the present invention.

INDUSTRIAL APPLICABILITY

According to the present invention, as mentioned above, it is possible to accomplish sufficient strength and at least sufficient water resistance, to exert a very excellent biodegradability and further to provide a biodegradable molded article having excellent moisture absorption strength mainly made from starch even if the biodegradable molded article has a complicated shape.

Accordingly, the biodegradable molded article in accordance with the present invention is preferably used as a molded article for wrapping such as GES and a tray for wrapping, a container of ready-to-eat food such as noodles (Chinese noodles, Japanese wheat noodles, buckwheat noodles, fried Chinese noodles and etc.), one-way plate or tray used in the catering industry, and a container of food such as soup and juice.

What is claimed is:

1. A method for producing a biodegradable molded article, comprising the steps of:
    directly heating a molding material by dielectric heating to form a biodegradable expanded molded article, the biodegradable expanded molded article being molded in a specified shape with an irregular surface by steam expansion molding of the molding material, and
    simultaneously thermally softening a coating film and attaching the thermally softened coating film to the irregular surface of the biodegradable expanded molded article so as to maintain the irregular surface of the biodegradable expanded molded article,
    wherein the coating film is mainly made of a biodegradable plastic and having at least hydrophobicity, the molding material is a slurry or dough molding material mainly made of a starch or a starch derivative and prepared by adding water to the starch or the starch derivative, and the starch or the starch derivative contains high-amylose starch or high-amylose starch derivative.

2. The method as set forth in claim 1, wherein the molding material is a slurry or dough molding material mainly made of a starch, and wherein the starch contains not less than 50 weight % high-amylose starch.

3. The method as set forth in claim 1, wherein the molding material is a slurry or dough molding material mainly made of a starch derivative, and wherein the starch derivative contains not less than 50 weight % high-amylose starch derivative.

4. The method as set forth in claim 1, wherein the coating film is mainly made of a modified polyester.

5. The method as set forth in claim 1, wherein the coating film is biaxially stretched.

6. The method as set forth in claim 1, wherein the molding material further contains a water-insoluble fiber.

7. The method as set forth in claim 1, wherein the expanded molded article accounts for not less than 60 weight % of the biodegradable molded article.

8. The method as set forth in claim 1, wherein the molding material contains water, and wherein the water in the molding material accounts for 20 weight % to 70 weight % of the molding material.

9. The method as set forth in claim 1, wherein the biodegradable expanded molded article, upon being formed, has a water content between 3 weight % and 20 weight %.

10. The method as set forth in claim 1, wherein heating of the molding material by dielectric heating is performed while simultaneously heating with an electric heater a metal mold that holds the molding material.

11. The method as set forth in claim 1, wherein the irregular surface of the biodegradable expanded molded article includes bumps and dips.

12. A method for producing a biodegradable molded article comprising the steps of:
    directly heating a molding material by dielectric heating to form a biodegradable expanded molded article, the biodegradable expanded molded article being molded in a specified shape with an irregular surface by steam expansion molding of the molding material, and
    simultaneously thermally softening a coating film and attaching the thermally softened coating film to the irregular surface of the biodegradable expanded molded article so as to maintain the irregular surface of the biodegradable expanded molded article,
    wherein the coating film is mainly made of a biodegradable plastic and having at least hydrophobicity, the molding material is a slurry or dough molding material mainly made of a starch or a starch derivative and prepared by adding water and polyvinyl alcohol to the starch or the starch derivative.

13. The method as set forth in claim 12, wherein the polyvinyl alcohol has a polymerization degree of not less than 1500.

14. The method as set forth in claim 12, wherein the polyvinyl alcohol has a saponification degree of not less than 75%.

15. The method as set forth in claim 12, wherein the coating film is mainly made of a modified polyester.

16. The method as set forth in claim 12, wherein the coating film is biaxially stretched.

17. The method as set forth in claim 12, wherein the molding material further contains a water-insoluble fiber.

18. The method as set forth in claim 12, wherein the expanded molded article accounts for not less than 60 weight % of the biodegradable molded article.

19. The method as set forth in claim 12, wherein the molding material contains water, and wherein the water in the molding material accounts for 20 weight % to 70 weight % of the molding material.

20. The method as set forth in claim 12, wherein the biodegradable expanded molded article, upon being formed, has a water content between 3 weight % and 20 weight %.

21. The method as set forth in claim 12, wherein heating of the molding material by dielectric heating is performed while simultaneously heating with an electric heater a metal mold that holds the molding material.

22. The method as set forth in claim 12, wherein the irregular surface of the biodegradable expanded molded article includes bumps and dips.

* * * * *